(12) United States Patent
Arnold et al.

(10) Patent No.: US 6,263,360 B1
(45) Date of Patent: Jul. 17, 2001

(54) SYSTEM USES FILTER TREE AND FEED HANDLER FOR UPDATING OBJECTS IN A CLIENT FROM A SERVER OBJECT LIST

(75) Inventors: James F. Arnold, Helena, MT (US); Scott W. Shaw, San Francisco, CA (US); Nathan W. Williams, Helena, MT (US); D. Scott Seaton, Fremont, CA (US); Carla P. Woodworth, San Mateo, CA (US); Jeffrey Casper, Mountain View, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 09/087,799

(22) Filed: Jun. 1, 1998

(51) Int. Cl.7 .............................. G06F 13/38; G06F 15/17
(52) U.S. Cl. ............................................. 709/203; 707/10
(58) Field of Search .................................. 709/203, 303, 709/304, 204; 707/10, 103; 705/5, 10

(56) References Cited

U.S. PATENT DOCUMENTS

| | | | |
|---|---|---|---|
| 5,339,392 | * 8/1994 | Risberg et al. | 345/333 |
| 5,754,771 | 5/1998 | Epperson et al. | 395/200 |
| 5,812,844 | * 9/1998 | Jones et al. | 709/104 |
| 5,813,007 | * 9/1998 | Nielsen | 707/10 |
| 5,826,270 | * 10/1998 | Rutkowski et al. | 707/10 |
| 5,835,087 | * 11/1998 | Herz et al. | 345/327 |
| 5,835,911 | * 11/1998 | Nakagawa et al. | 707/203 |
| 5,918,013 | * 6/1999 | Mighdoll et al. | 709/217 |
| 5,918,214 | * 6/1999 | Perkoski | 705/27 |
| 5,920,725 | * 7/1999 | Ma et al. | 395/712 |
| 5,937,189 | * 8/1999 | Branson et al. | 395/701 |
| 5,948,066 | * 9/1999 | Whalen et al. | 709/229 |
| 5,959,543 | * 9/1999 | Laporta et al. | 340/825.44 |
| 5,978,577 | * 11/1999 | Rierden et al. | 709/203 |
| 6,029,175 | * 2/2000 | Chow | 707/104 |
| 6,041,360 | * 3/2000 | Himmel et al. | 709/245 |

FOREIGN PATENT DOCUMENTS

| | | |
|---|---|---|
| 0553560A2 | 8/1993 | (EP). |
| 0817031A2 | 1/1998 | (EP). |
| WO98/02812 | 1/1998 | (WO). |
| WO98/19239 | 5/1998 | (WO). |

OTHER PUBLICATIONS

Feiler et al., Propagator: a family of patterns, 12 p, Aug. 1997.*

Canos et al., KAOS: an object–oriented software tool for the objects definition updating, querying and programming in an object–oriented environment, 5 p, May 1998.*

Plasil et al, SOFA/DCUP: architecture for component trading and dynamic updating, 10 p, May 1998.*

Bukhres et al., Mobile Computing in Military Ambulatory Care, 1997, Proceedings from the Tenth IEEE Symposium on Computer–Based Medical Systems.

IBM Technical Disclosure Bulletin, Event Notification Mechanism, 1993, vol. 36, No. 4.

* cited by examiner

Primary Examiner—Le Hien Luu
Assistant Examiner—Bunjob Jaroenchonwanit
(74) Attorney, Agent, or Firm—Beyer Weaver & Thomas, LLP

(57) ABSTRACT

Methods and apparatus for maintaining updated information on client/server object-oriented computing systems are disclosed. In accordance with one aspect of the present invention, a client/server object-based computing system includes a server which has a server object list that is arranged to include objects that are to be updated. The system also includes a client which has a client object list that contains an object in which the client has interest. The objects that are to be updated include the object in which the client has interest, and the server is arranged to send a message to the client that indicates that the object in which the client has interested should be updated on the client. In one embodiment, the client and the server are in communication over a low-bandwidth link.

22 Claims, 22 Drawing Sheets

SYSTEM USES FILTER TREE AND FEED HANDLER FOR UPDATING OBJECTS IN A CLIENT FROM A SERVER OBJECT LIST

BACKGROUND OF THE INVENTION

1. Field of Invention

The present invention relates generally to client/server object-oriented computing systems. More particularly, the present invention relates to maintaining updated information on low-bandwidth client/server object-oriented computing systems.

2. Description of the Related Art

The use of object-oriented computing systems, e.g., distributed object-oriented computing systems, is increasing as the use of networked computing systems increases. Networked computing systems such as object-oriented computing systems generally allow resources to be shared among different computers associated with the network. Object-oriented computing systems often use client/server models. That is, many object-oriented computing systems are client/server computing systems. A client, which is in communication with a server, is typically arranged to remotely accesses resources associated with a server.

With reference to FIG. 1, the interactions between a server and clients which are linked via a network will be described. In general, within a client/server object-oriented computing system 100, a server 102 is in communication with clients 106. Although communications between server 102 and clients 106 may generally be initiated using an object request broker (ORB) as will be appreciated by those skilled in the art, communications often take place directly between server 102 and clients 106. By way of example, when client 106a requires information that is available on server 102, once a communications link 110a is established between client 106a and server 102, client 106a may request information directly from server 102. Similarly, when server 102 responds to a request from client 106a, server 102 may respond directly to client 106a. As such, information on server 102 may essentially always be available to clients via communications links 110.

In client/server object-oriented computing system 100, communications links 110 are typically high bandwidth links, and clients 106 are typically non-volatile clients. That is, once established, communications links 110 remain established until they are deactivated by server 102 or clients 106. Hence, clients 106 remain in communication with server 102, e.g., "subscribed" to server 102, until such time as clients 106 "desubscribe" themselves from server 102. Since a client, as for example client 106a, generally remains linked to server 102 until client 106a terminates link 110a, client 106a may request and retrieve information from server 102a, or a database (not shown) associated with server 102a, at substantially any time.

As technology that facilitates wireless communications, e.g., communications over a radio frequency (RF) link, improves, the use of RF links in client/server object-oriented computing systems is increasing. RF links in client/server object-oriented computing systems are often used when a client, and even a server, are located at temporary sites and, further, may be constantly moving. For example, RF links may be used to link clients that are "out in the field," or otherwise subject to constant relocation, to a server. Systems with clients that are out in the field generally include, but are not limited to, clients that are associated with military operations and clients that are associated with emergency activities.

As clients move, the clients may move in and out of the RF communications range of the server. Since the clients may move out of the RF communications range of the server, the RF communications links are intermittent links in that they may not always be available. Further, these links are also low-bandwidth links because the rate if data transfer is often approximately one two-hundredth of the transfer rate of cabled networks. Hence, the clients are effectively volatile clients, as they may not be in communication with the server when they attempt to request information from the server.

The ability for a client in the field to access up-to-date information may be crucial. By way of example, when a client is associated with resources which are needed in emergency activities, the client may need to know where its resources are most needed at any given time. However, if the RF link between the client and the server is not available, e.g., if the client is out of range with respect to the server, the client may not obtain updated information from the client. The inability to obtain updated, timely information may cause the resources associated with the client to be inefficiently, or even incorrectly, allocated.

Therefore, what is needed is a method and an apparatus for providing a client with updated, timely information when the client is a volatile client that is linked to a server through an intermittent link such as an RF link. In other words, what is desired is an efficient method and apparatus for allowing a client in a low-bandwidth client/server computing system to have access to updated, timely information associated with a server.

SUMMARY OF THE INVENTION

The present invention relates to maintaining updated information on client/server object-oriented computing systems. In accordance with one aspect of the present invention, a client/server object-based computing system includes a server which has a server object list that is arranged to include objects that are to be updated. The system also includes a client which has a client object list that contains an object in which the client has interest. The objects that are to be updated include the object in which the client has interest, and the server is arranged to send a message to the client that indicates that the object in which the client has interest should be updated on the client. In one embodiment, the client and the server are in communication over a low-bandwidth link.

In another embodiment, the client is further arranged to update the object in which the client has interest using a handler associated with the client. In such an embodiment, the system may also include a feed handler that is in communication with the handler and the server. The feed handler may be arranged to queue messages from the handler which are intended for the server.

According to another aspect of the present invention, a client/server object-based computing environment includes a server with a server object list and a client with a client object list, where the client communicates with the server using a client thread that is a part of the server. The server object list is arranged to include an object that is to be updated, and is further arranged to be copied into a data file that is associated with the server. The client object list includes at least one object that is of interest to the client, and the client thread is arranged to reference the server object list. In one embodiment, the server further includes a filter tree that is also referenced by the client thread. The filter tree is arranged to determine whether the object that is of interest to the client is a representation of the object that is to be updated.

In another embodiment, the client is arranged to send a request to the server through the client thread, and the server is arranged to receive the request from the client through the client thread. In such an embodiment, the request may be a request to update the server object, and the server may further be arranged to update the server object by placing the object update in the server object list.

According to still another aspect of the present invention, a method for providing a client that is a part of a client/server object-based computing system with updated object information pertaining to an object in which the client has interest includes sending a message to the client from a server that is also part of the client/server object-based computing system. The message is arranged to include updated object information. The method also includes determining whether the message is a message to update the object in which the client has interest, and updating the object in which the client has interest when it is determined that the message is a message to update the object in which the client has interest. Further, when it is determined that the message is a message to update the object in which the client has interest, the indication is that the object in which the client has interest has a representation on the server.

According to yet another aspect of the present invention, a method for updating a first object on a client that is arranged to be a part of a client/server object-based computing environment includes determining whether there is a second object that is referenced by the first object when the first object is in existence on the client, and sending an update message to a handler that is associated with the first object when the first object is in existence on the client. The method also includes adding a reference that identifies the second object to the first object when it is determined that the second object is referenced by the first object, and sending a notification message to the handler that is arranged to indicate the existence of the second object when it is determined that the second object is referenced by the first object.

In one embodiment, the method further includes notifying an observer, which is linked to the client, that the first object has been updated. In another embodiment, the method includes determining whether the first object is in existence on the client, obtaining a class name for the handler that is associated with the first object when it is determined that the first object is not in existence on the client, and creating an instance of the handler, which is the first object.

These and other advantages of the present invention will become apparent upon reading the following detailed descriptions and studying the various figures of the drawings.

BRIEF DESCRIPTION OF THE DRAWINGS

The present invention may best be understood by reference to the following description taken in conjunction with the accompanying drawings in which.

DETAILED DESCRIPTION OF THE EMBODIMENTS

Intermittent links, such as radio frequency (RF) links, are often used in client/server object-oriented computing systems when the location of a client, with respect to a server, may vary. Such clients are generally considered to be "out in the field" with respect to a server. Systems with clients that are out in the field may include, but are not limited to, clients that are associated with mobile military operations and clients that are associated with emergency activities.

When a client and a server are communicably linked using an intermittent, low-bandwidth link, when clients move, the clients may move in and out of the range of the server. For example, when the client and the server are arranged in communication over a RF link, the client may move to a position or a location which is not in the RF range of the server. When the client is out of the RF range of the server, the client typically may not communicate with the server. As a result, the client may not access information, particularly updated information, from the server. The inability to obtain updated, timely information may cause resources associated with the client to be inefficiently used and, when the client is associated with mobile operations, adversely affect the operations.

By allowing clients to maintain local copies of objects which are located on an associated server, and updating the objects as necessary when the client and the server are in communication, the client maintains what are at least fairly recent copies of the objects. Hence, if the client moves out of the communications range of the server, the client has access to relatively up-to-date information. When the client moves back into the communications range of the server, then the server may provide the client with updated, or current, information. That is, the server may effectively update the local copies of the objects that are present on the client, as for example in a local cache.

Figure 1:
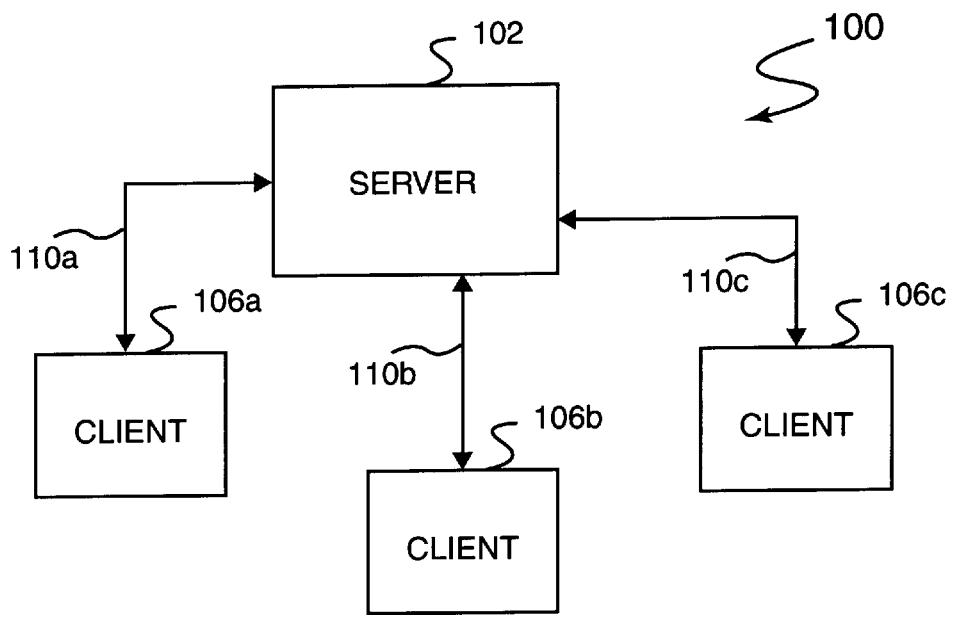
FIG. 1 is a diagrammatic representation of the interactions between clients and a server in a conventional client/server computing system.
Figure 2A:
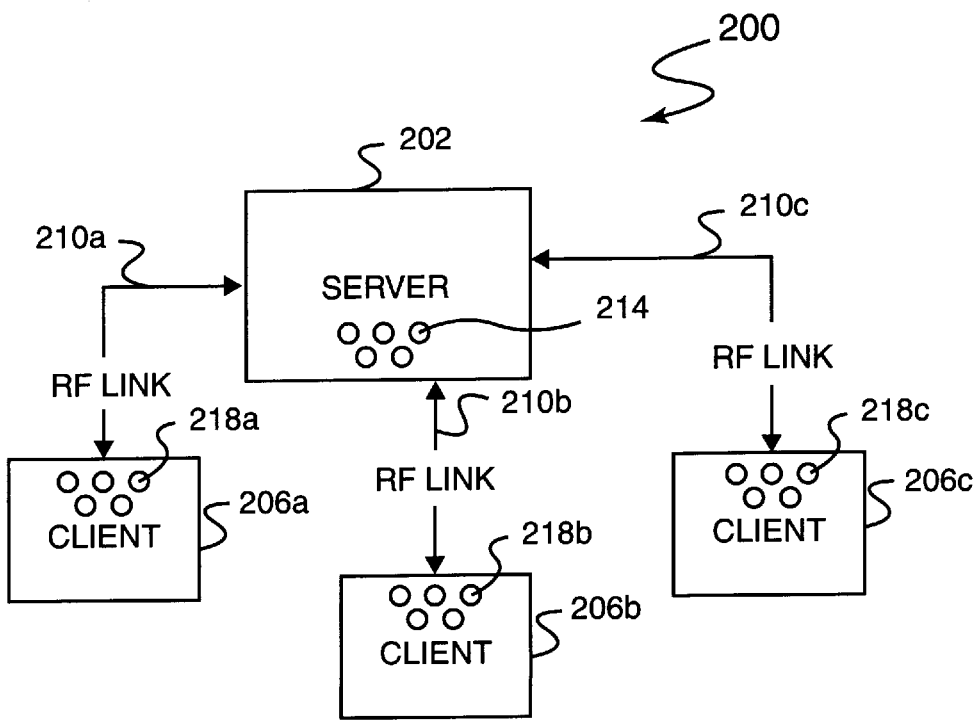
FIG. 2a is a diagrammatic representation of a low-bandwidth client/server computing system in accordance with an embodiment of the present invention.

Referring to FIG. 2*a*, a low-bandwidth client/server computing system will be described in accordance with an embodiment of the present invention. A client/server computing system 200 includes a server 202, which may be a database server, that is arranged to be in communication with clients 206 over links 210. Clients 206 may, in one embodiment, be "thin" clients, or clients which generally do not include hard disks, and have relatively slow processors. It should be appreciated that although links 210 may generally be any links which are suitable for allowing server 202 to communicate with clients 206, in the described embodiment, links 210 are low-bandwidth, intermittent links. Specifically, in the described embodiment, links 210 are RF links which allow synchronous communication between server 202 and each client 206. In general, links 210 may not always be active. As previously mentioned, when a client 206 moves out of range of server 202, the associated link 210 may be lost.

Server 202 typically includes multiple objects 214. Objects 214, as will be appreciated by those skilled in the art, are generally programming units which include data and functionality, and are instances of classes. In one embodiment, server 202 may also include meta-objects, which are objects that have no physical representation, and are effectively classes with methods and attributes that serves as a factory to create new objects. Meta-objects may not be instantiated, i.e., meta-objects generally do not provide a representation of a physical object. Instead, meta-objects may serve as templates from which objects which represent physical objects are constructed.

Clients 206 may register interest in certain objects 214 on server 202. For example, clients 206 may be interested in updated information pertaining to particular objects 214. Relevant objects 214 associated with server 202 may be replicated, i.e., databases associated with server 202 may be replicated, on each client 202 to provide each client 206 with local copies 218 of objects 214. Local copies 218 allow clients 206 to have access to relatively current object information in the event that clients 206 and server 202 lose contact with one another. In other words, when a link such as link 210*a* is lost, local copies 218*a*, which are active entities, may continue to run on client 206*a*.

In general, as communications between server 202 and clients 206 is synchronous, server 202 is effectively aware of all objects that are associated with clients 206. Server 202 may then be able to save state information associated with each client 206. Therefore, server 202 may restore the current state of each client 206 as appropriate, e.g., when lost links 210 are re-established. It should be appreciated, however, that server 202 is generally not aware of any semantics with regards to objects 214. Rather, server 202 is effectively only aware that objects 214 have been updated, and, further, that the corresponding updates should be forwarded to clients 206 as appropriate.

Figure 2B:
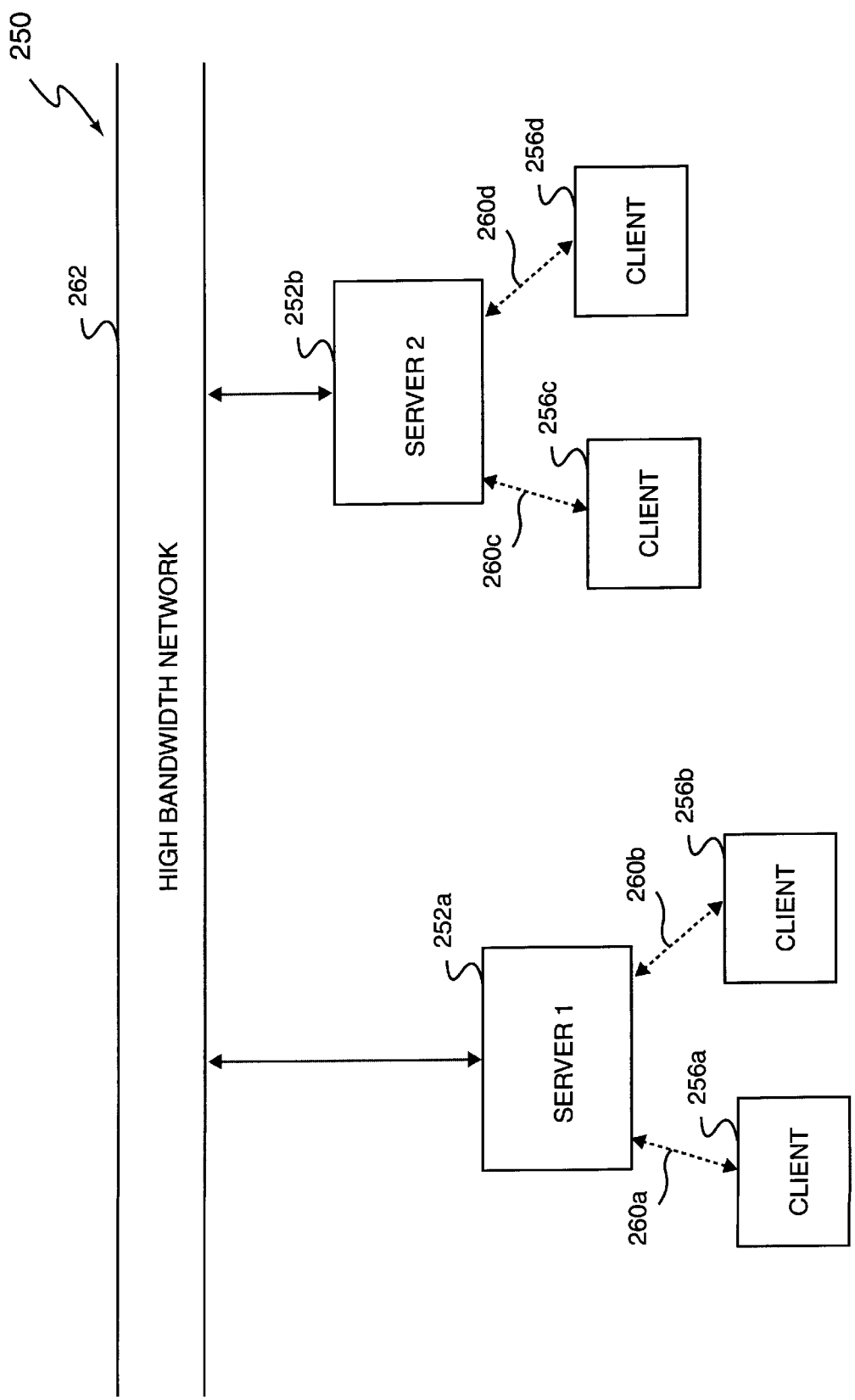
FIG. 2b is a diagrammatic representation of a networked client/server computing system which allows one server to be replicated on another server in accordance with an embodiment of the present invention.

In addition to replicating objects 214 that are associated with server 202 on clients 206, objects 214 may generally be replicated on other servers. With reference to FIG. 2*b*, the replication of one server in another server will be described in accordance with an embodiment of the present invention. Generally, within an overall client/server computing system 250, a "copy" of a first server 252*a* may be made on a second server 252*b*. That is, first server 252*a* may be replicated on second server 252*b*. In one embodiment, first server 252*a* communicates with clients 256*a*, 256*b* over low bandwidth links 260*a*, 260*b*, respectively. However, server 252*a* communicates with second server 252*b* over a high bandwidth network 262. Hence, communications between first server 252*a* and second server 252*b* are essentially always possible.

By allowing the contents of server 252*a* to be replicated on second server 252*b*, the contents of server 252*a* will effectively be available in the event of a failure of server 252*a*. In addition, since server 252 may each generally only support a limited number of clients 256, "duplicate" servers allow a larger number of clients 256 to be served. As a result, the scalability of client/server computing system 250 may be improved. In the described embodiment, replicating first server 252*a* on second server 252*b* may also allow a client, as for example client 256c, which is out of the communications range of first server 252, to communicate with second server 252b. Hence, client 256c may still receive current information, even without being in substantially direct communication with server 252a.

Figure 3:
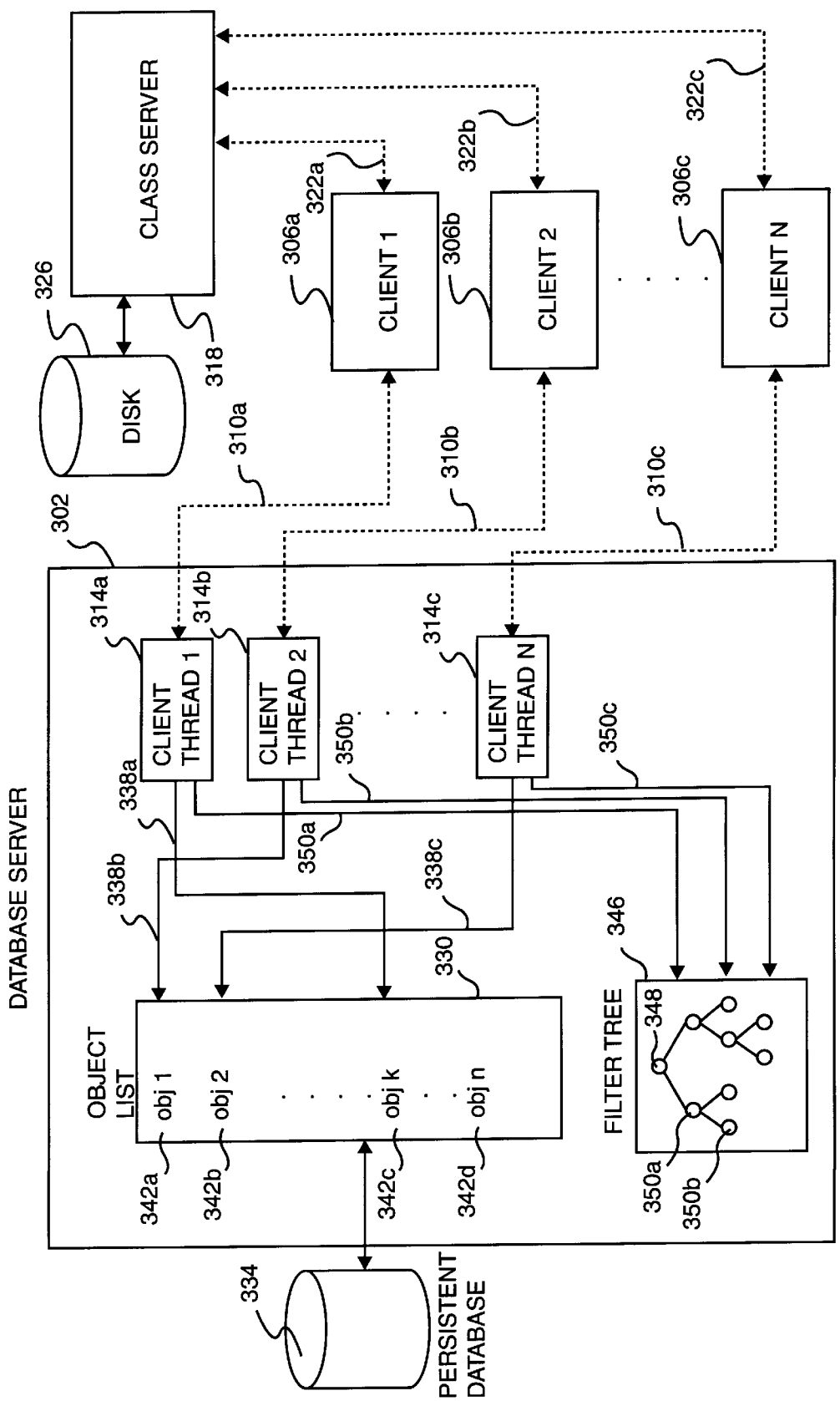
FIG. 3 is a diagrammatic representation of a server that is a part of a client/server computing environment in accordance with an embodiment of the present invention.
Figure 4:
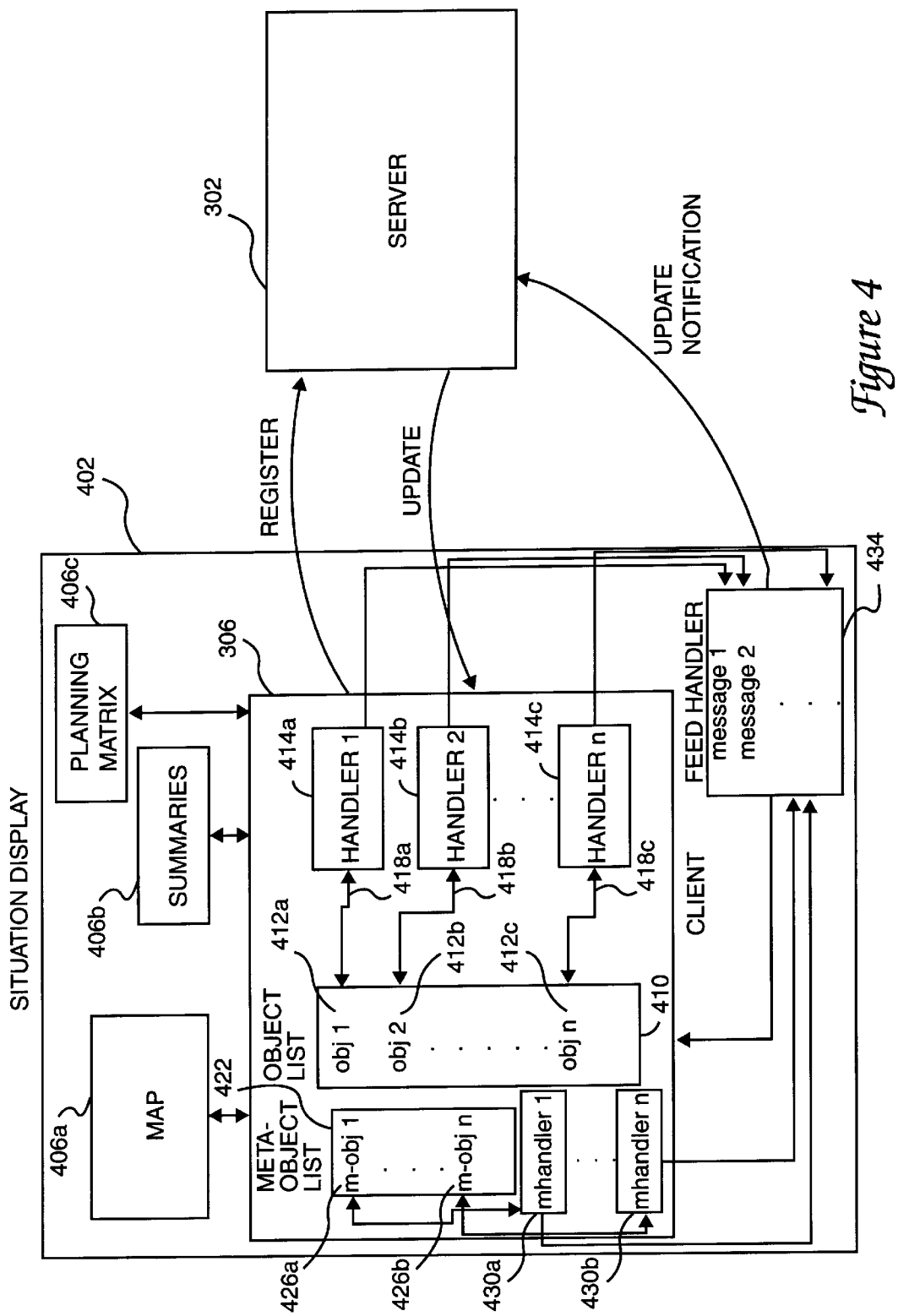
FIG. 4 is a diagrammatic representation of a client that is a part of a client/server computing environment in accordance with an embodiment of the present invention.

In general, the overall configuration of a server and a client may vary widely. Specifically, the contents of a server and the contents of a client may vary depending upon the requirements of the overall client/server computing system. With reference to FIGS. 3 and 4, one suitable embodiment of a server and one suitable embodiment of a client, respectively, will be described.

FIG. 3 is a diagrammatic representation of a server that is a part of an overall client/server computing environment in accordance with an embodiment of the present invention. A server 302, e.g., a database server, is arranged to communicate with clients 306. Server 302, in one embodiment, is part of an InCON® server, which is a part of an overall InCON® Command and Control System, developed by SRI International of Menlo Park, Calif.

Connections 310 between server 302 and clients 306 are established such that server 302 may communicate with clients 306. Specifically, connections 310 are formed between client threads 314 on server 302 and clients 306. Hence, each client thread 314 has an associated client 306. The number of clients 306 and, hence, the number of client threads 314, associated with server 302 may generally vary widely in accordance with the requirements of the overall client/server system.

Clients 306, which will be discussed below with reference to FIG. 4, are in communication with server 302 as well as a class server 318. Class server 318 is a streaming data server which is accessed by clients 306, via connections 322, to download relatively large amounts of data. By way of example, class server 318 may be used by clients 306 to load large software packages on clients 306 when clients 306 are started up. In some embodiments, class server 318 may be associated with a common object request broker architecture (CORBA), and enables desired methods which are not present on a particular client, e.g., client 306a, to be obtained by the particular client. Class server 318 may be coupled to a storage medium, such as a disk 326, which may be used to store information associated with class server 318.

Server 302 includes an object list 330 that is effectively a list of all objects 342, which are associated with server 302, that are to be updated. In other words, object list 330 is a queue of object updates. Generally, object list 330 may also include meta-object updates. It should be appreciated that object list 330 is persistent and, hence, may be copied into a persistent database 334, or substantially any other suitable persistent storage medium including, but not limited to, a persistent data file and a persistent disk. By storing copies of information such as object list 330 in a non-volatile medium such as persistent database 334, when server 302 is taken off-line then started up again, object list 330 may be reconstructed from the associated copy stored in persistent database 334.

Each client thread 314a maintains an index 338, e.g., a pointer, to object list 330. Each index 338, as for example index 338a, points to the location within object list 330 that identifies the next object 342 in object list 330 which may potentially be updated on client 306a. In other words, as shown, if object "k" 342c is of interest to client 306a, then client 306a will be updated accordingly. Once client 306a is updated, index 338a may be moved to reference the next object 342 in object list 330. Alternatively, if object "k" 342c is not of interest to client 306a, then client 306a is not updated, and index 338a is moved to reference the next object 342.

Server 302 also includes a filter tree 346, which is referenced by client threads 314. In one embodiment, indexes 350 are used by client threads 314 to index filter tree 346. Filter tree 342 generally includes a root 348 that is associated with specific topics 350. Specific topics 350 are topics which may be of interest to different clients 306. Generally, specific topics 350 which are of interest to different clients 306 are used in the determination of which objects 342 in object list 330 are of interest to clients 306. That is, filter tree 346 is arranged to serve as a filter for filtering out objects 342 that are not of interest to a given client 306.

With reference to FIG. 4, a client, e.g., client 306 of FIG. 3, will be described in accordance with an embodiment of the present invention. Client 306 is part of a situation display 402, as for example an InCON® Situation Display developed by SRI International of Menlo Park, Calif. Situation display 402 is generally arranged to provide a background and organizing framework for the graphic display of selected objects. In an InCON® Situation Display, for example, geographic locations are used as an organizing principal, and objects which are displayed may represent real-world items in locations relative to an underlying map. However, it should be appreciated that situation display 402 may generally use substantially any suitable organizing principal including, but not limited to, organizational charting arranged to show authoritative relationships among objects, and schematic charting arranged to show operational relationships among objects.

Client 306 may communicate substantially directly with server 302 once client 306 has been registered with respect to server 302. That is, client 306 may send commands to server. In one embodiment, such commands may include lists of topics in which client 306 is interested. Server 302, on the other hand, may send update messages to client 306 to indicate that certain objects on client 306 should be updated such that the states of the objects on client 306 are consistent with the states of the corresponding objects on server 302.

Client 306 includes an object list 410, i.e., a client object list, that contains substantially all objects 412 that are associated with client 306. In one embodiment, object list 410 may be a filtered version of object list 330 of FIG. 3. Client 306 also includes handlers 414 which are used to handle the semantics of data associated with client 306, and contain configuration information that may be used by client 306. Handlers 414 are also arranged to be used by client 306 in order to run methods associated with objects 412. Handlers 414 may generally also be considered to be classes which have a property of causing objects 412 which are instantiated from handlers 414 by client 306 to be substantially automatically shared with server 302 and, hence, other clients associated with server 302. Client 306 generally establishes links 418 between objects 412 in object list 410 and handlers 414.

Client 306 also includes a meta-object list 422 of meta-objects 426. Handlers 430 are typically arranged to run methods associated with meta-objects 426. Both handlers 414 and handlers 430 interface with a feed handler 434. Feed handler 434 may generally be considered as a queue for server 302, as feed handler 434 includes messages which are to be processed by server 302. Although the contents of the messages may vary, the contents are typically update messages arranged to instruct the server that certain objects, e.g., objects 412, have been updated on client 306. Feed handler 434 is further arranged to manage data, and, hence, to receives messages from handlers 414, 430.

In addition to including client 306, situation display 402 may include a number of observers 406 which are in communication with client 306. Observers 406 are generally arranged to permit an object to register interest in an "observable" object. In the described embodiment, observers 406 may be constructs created in the Java programming language, which was developed by Sun Microsystems, Inc. of Palo Alto, Calif. Registering interest in an observable object allows observers 406 to be notified of substantially any change to the observed object.

Although observers 406 associated with situation display 402 may be widely varied, in one embodiment, observers 406 include a map 406a, summaries 406b, and a planning matrix 406c. Map 406a is a display, which generally includes a user interface such as a graphical user interface (GUI), that is used to display objects 412 as appropriate. By way of example, map 406a may be a road map of a particular area, and objects such as vehicles may be displayed as icons on the road map. Map 406a may be arranged such that a user who is interfacing with client 306 through map 406a may easily manipulate the "object displays," e.g., icons, to effectively update the state of objects 412. When map 406a registers an interest in particular objects, when the states of those objects change, map 406a is notified of the changes, and typically changes its display accordingly.

Summaries 406b are generally objects which provide information concerning the state of particular objects. For example, summaries 406b may provide abstracted or summarized information that relates to the state of selected attributes among identified objects of interest.

Planning matrix 406c is arranged to provide information pertaining to objects 412. Specifically, planning matrix 406c may be used in conjunction with map 406a to provide object information. For example, if map 406a is a road map of a disaster area, planning matrix 406c may be used to allocate objects 412 which represent resources, e.g., manpower and vehicles, organizationally, by associating types of resources against disaster incidents to substantially optimally manage the disaster incidents. The resources, or objects 412, may be readily allocated when planning matrix 406c is used to present information such that a user may easily identify objects 412. That is, the resources or objects 412 may be efficiently allocated and reallocated with respect to the disaster area when planning matrix 406c is used to provide readily accessible information regarding the resource types.

Figure 5:
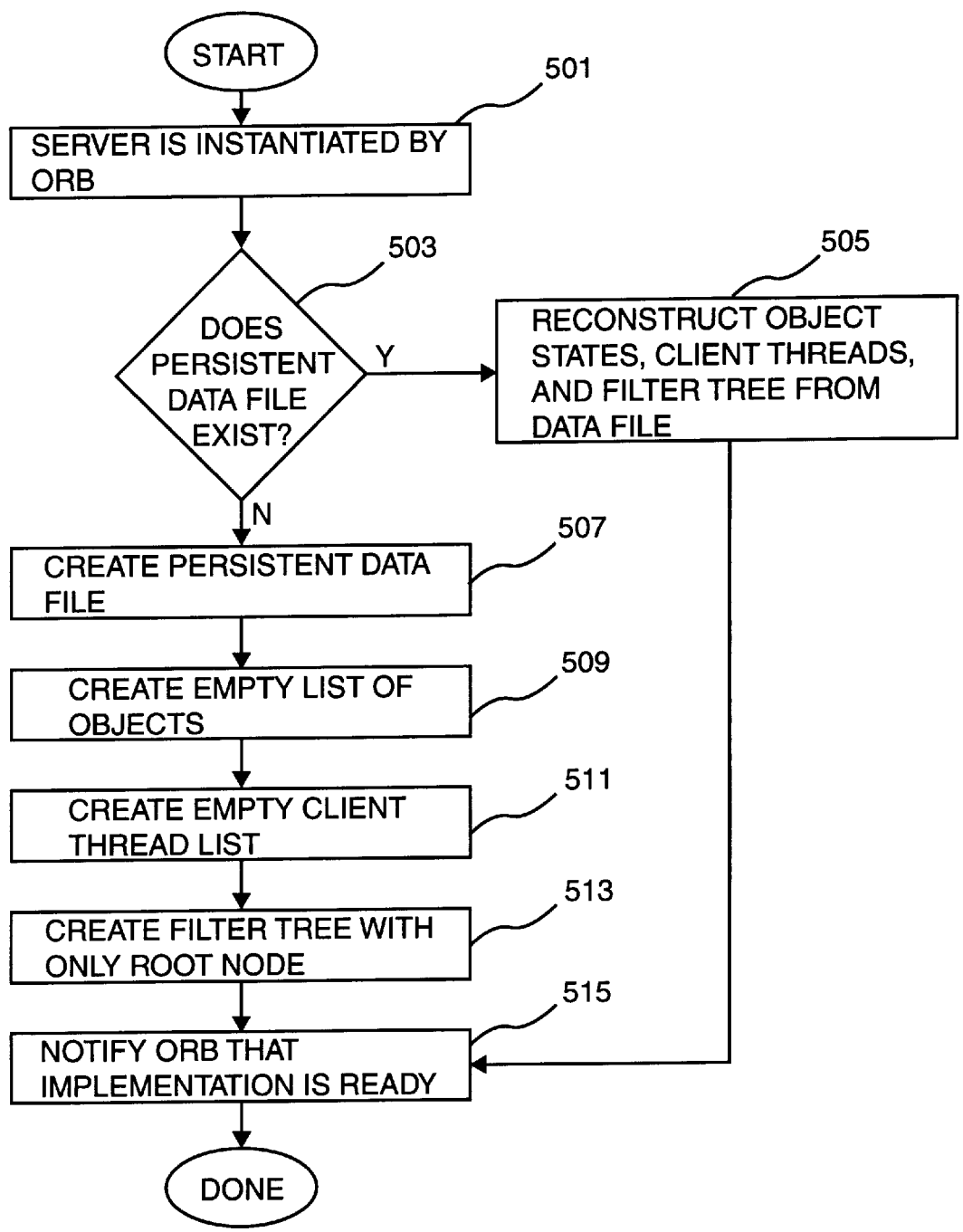
FIG. 5 is a process flow diagram which illustrates the steps associated with the start up of a server in accordance with an embodiment of the present invention.

Before a client and a server may communicate, both the server and the client are started up. The steps associated with starting up a server will be described with reference to FIG. 5, while the steps associated with starting up a client will be described with respect to FIG. 13. FIG. 5 is a process flow diagram which illustrates the steps associated with the start up of a server in accordance with an embodiment of the present invention. In general, a server may be started up in response to a request from a client. When a client makes a request to start up a server, the client makes the request through an object request broker (ORB) which then contacts the server.

The process of starting up a server begins in step 501 in which the server is instantiated by the ORB, in response to a request from the client. The process used in the instantiation of the server using an ORB may vary widely, as will be appreciated by those skilled in the art. Once the server is instantiated, a determination is made in step 503 regarding whether there is a database service, e.g., a persistent data file, associated with the server. In other words, it is determined whether a persistent data file exists. The persistent data file is generally arranged to store data, such as objects, that are associated with the server. Hence, the persistent data file is arranged to hold information relating to object states, client threads, and a filter tree associated with the server.

When the determination in step 503 is that a persistent data file does not exist, a persistent data file is created in step 507 using substantially any suitable method. After the persistent data file is created, a list of objects is created in step 509. It should be appreciated that the list of objects will typically be empty. Although the list of objects may take on a variety of different formats, in one embodiment, the list of objects has the format of a persistent hash table.

Once the list of objects is created, process flow proceeds to step 511 where a client thread list is created. Like the list of objects, the client thread list will initially be empty, and may also have the format of a persistent hash table. A filter tree is created in step 513 such that substantially only a root node is present in the filter tree. In the described embodiment, the filter tree is a two-dimensional hash table of filter topics indexed against clients which are registered for each topic. It should be appreciated that the filter tree may also include a table of child sub-topics associated with each topic. After the filter tree is created, then in step 515, the server sends a notification to the client, via the ORB, that the server is "ready," or started up, and the process of starting up a server is completed. In the described embodiment, once the server is started up, the server awaits commands, e.g., requests, which may be received from the ORB or from various clients that are associated with the server.

Returning to step 503, if it is determined that a persistent data file is in existence, the objects states, the client threads, and the filter tree associated with the server are reconstructed in step 505 using information contained in the persistent data file. In other words, the server is "updated" using the information in the persistent data file. Once the object states, the client threads, and the filter tree are reconstructed, process flow moves to step 515 in which the ORB is notified that the server implementation is ready.

After the server is started up, the server is then ready to process requests from clients which are in communication with the server. Initially, after a server is first started up, the server will generally receive requests from clients through an ORB. Specifically, requests to register a client with the server will be forwarded from the client to the server through an ORB. Once a client is registered, however, requests are generally passed directly from the client to the server, although it should be appreciated that requests may still be passed through an ORB. When a request is passed through an ORB, it should be appreciated that the ORB may then invoke the correct code on the server to process the request.

Figure 6:
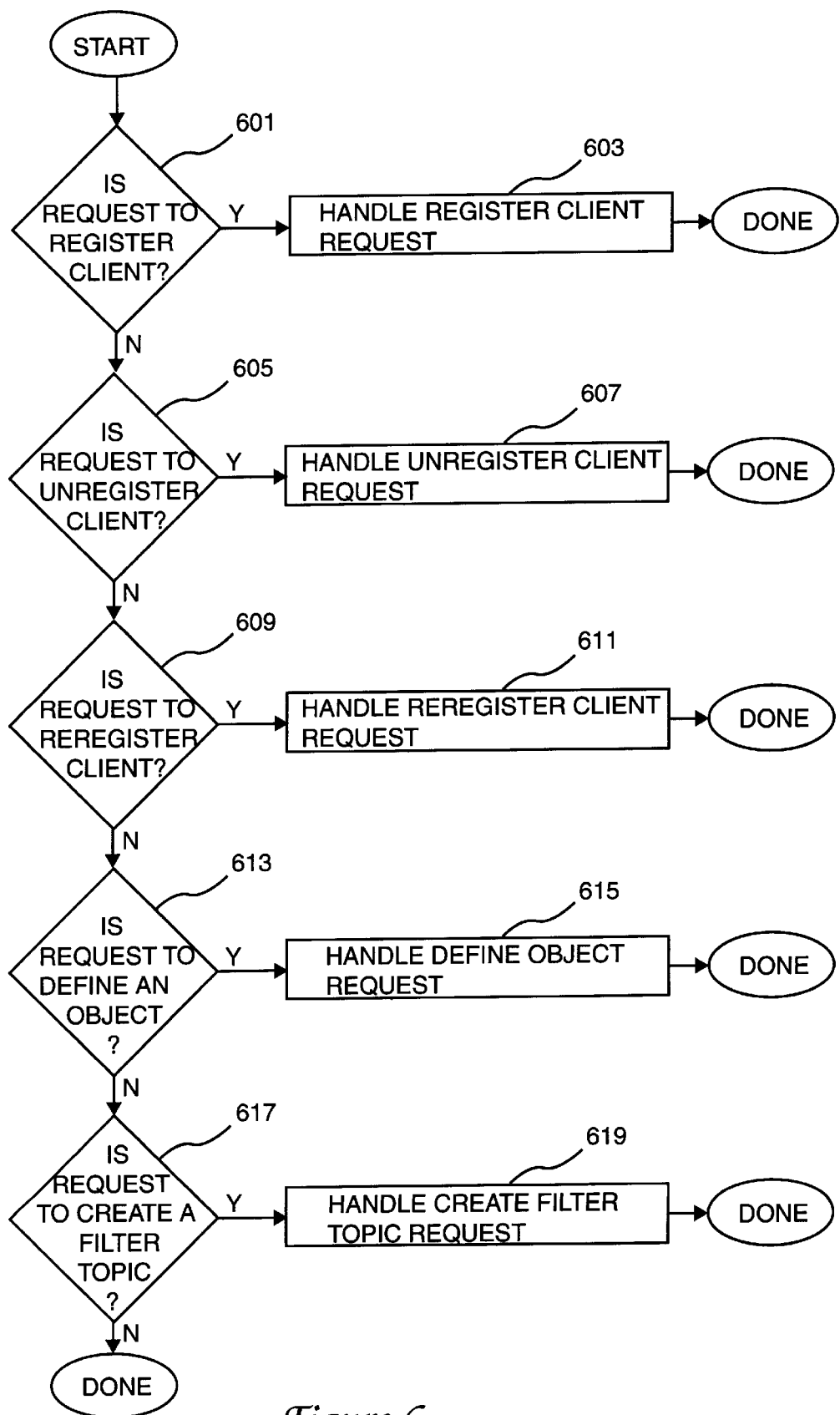
FIG. 6 is a process flow diagram which illustrates the overall steps associated with processing a request from a client to a server in accordance with an embodiment of the present invention.

FIG. 6 is a process flow diagram which illustrates the overall steps associated with processing a request from a client to a server in accordance with an embodiment of the present invention. When a request is received on a running server either directly or indirectly, e.g., via an ORB, from a client, the server typically determines how to handle the request. Once a request is received, a determination is made in step 601 regarding whether the request is a request to register a client with the server. Such a request is generally passed to the server through an ORB. When a client sends a register client request, the client is attempting to open a communications link with the server. Although arguments included in the register client request may vary, the arguments often include, but are not limited to, a filter topic list of topics that are of interest to the client, and a location of the client, e.g., a uniform resource locator (URL) address for the client.

If it is determined in step 601 that the request is a register client request, the register client request is handled in step 603. The steps associated with handling the register client request will be described below with reference to FIG. 8. After the register client request is handled, then the processing of the request is completed, and the server awaits another command or request. Alternatively, if it is determined in step 601 that the request is not a request to register a client, then process flow moves from step 605 where a determination is made regarding whether the request is an unregister client request.

When it is determined that the request is a request to unregister a client from the server, the unregister handle client request is handled in step 607. Unregistering a client typically involves closing a connection between the client and the server. One method of unregistering a client will be discussed below with reference to FIG. 9. Once the client is unregistered, i.e., after the unregister client request is handled, the processing of the request is completed, and the server awaits another request.

Alternatively, if the determination in step 605 is that the request received by the server is not a request to unregister a client, then in step 609, a determination is made as to whether the request is a reregister client request. In general, a reregister client request is a request to change filtering topics associated with a client. Hence, arguments associated with a reregister client request often include a filter topic list. If it is determined that the request is a reregister client request, then the reregister client request is handled in step 611, which will be described below with respect to FIG. 10. After the reregister client request is processed, the server essentially awaits a subsequent request from a client.

When it is determined in step 609 that the request is not a request to reregister a client, it is determined in step 613 whether the request is a request to define an object, e.g., an object that is associated with the client. If the request is determined to be an define object request, the define object request is handled in step 615. One method of processing a define object request will be described below with reference to FIG. 7. Once the define object request is handled, the server "listens" for additional requests which may come either directly or indirectly from the client. In one embodiment, a define object request may be an update object request.

In the described embodiment, if it is determined in step 613 that the request is not a define object request, then a determination is made in step 617 regarding whether the request is a request to create a filter topic. A request to create a filter topic is essentially a request to create a filter topic for the client on the server. If the determination is that the request is a filter topic request, then process flow moves from step 617 to step 619 where the create filter topic request is handled. In general, the steps associated with creating a filter topic may vary. One example of a suitable method for use in handling a create filter topic request will be discussed below with respect to FIG. 11. After the create filter topic request is processed, the server awaits additional requests.

Alternatively, if the determination in step 617 is that the request is not a request to create a filter topic, then the overall processing of a request is completed. In one embodiment, when it is determined that the request is not a create filter topic request, an exception may be thrown to indicate that the request is invalid. However, as the request is typically either a register client request, and unregister client request, a reregister client request, an update object request, or a create filter topic request, it should be appreciated that the determination in step 617 will generally not be that the request is not a create filter topic request.

Figure 7:
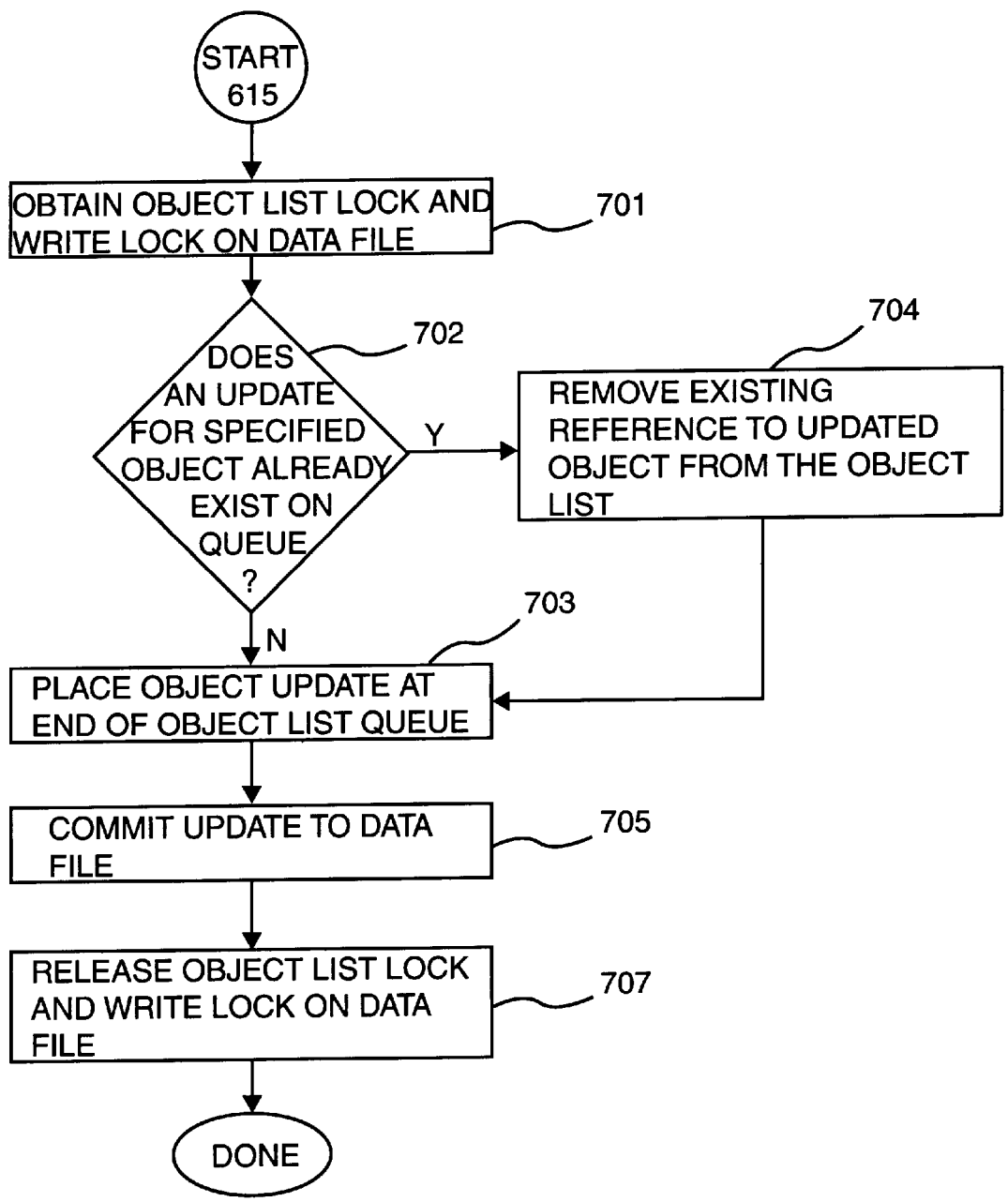
FIG. 7 is a process flow diagram which illustrates the steps associated with handling a define object request, i.e., step 615 of FIG. 6, in accordance with an embodiment of the present invention.

With reference to FIG. 7, one method of handling a define object request will be described. In other words, step 615 of FIG. 6 will be described in accordance with an embodiment of the present invention. A define object request is a request to define, e.g., update, the state of an object that is associated with the client. It should be appreciated that an existing object may have one or more attributes changed, or a new object with the changed attributes may be defined to replace the existing object, which may then be removed. Hence, in some embodiments, a define object request may effectively be an update object request. The processing of a define object request begins at step 701 in which locks are obtained from the object list and from the data file, e.g., the persistent data file associated with the server. It should be appreciated that the data file may be associated with a database such as a persistent database. Typically, obtaining the lock from the data file opens a transaction with the data file such that the contents of the data file may be modified. In one embodiment, the locks are write locks which prevent more than one client thread from attempting to write to the object list and the data file at any given time. The locks may generally be any suitable type of lock. By way of example, the locks may be mutex locks or binary semaphores.

After the object list lock and the lock on the data file are acquired, a determination is made in step 702 as to whether an update for the specified object already exists on a queue, i.e., the object list or the object list queue, associated with the server. The specified object is the object that is specified in the object update request. If the determination is that an update for the object is not already in the object list, then the object update is placed at the end of the object list in step 703. From step 703, process flow moves to step 705 where the update for the object is committed to the data file. In other words, the update is saved into the data file. Once the update is committed to the data file, both the object list lock and the lock on the data file are released in step 707 to enable them to be acquired by another thread as needed, and the process of handling a define object request is completed.

Returning to step 702, if it is determined that an update for the specified object is already in existence in the object list, then the indication is that the previous update for the specified object has not been processed. Hence, in the described embodiment, the previous update will effectively be overwritten by the object update specified in the object update request. Accordingly, in step 704, the existing reference to the updated object, e.g., the object update that is already in existence in the object list, is removed from the object list. After the existing reference to the updated object is removed, then process control proceeds to step 703 in which the object update, i.e., the "new" object update, is placed at the end of the object list.

Figure 8:
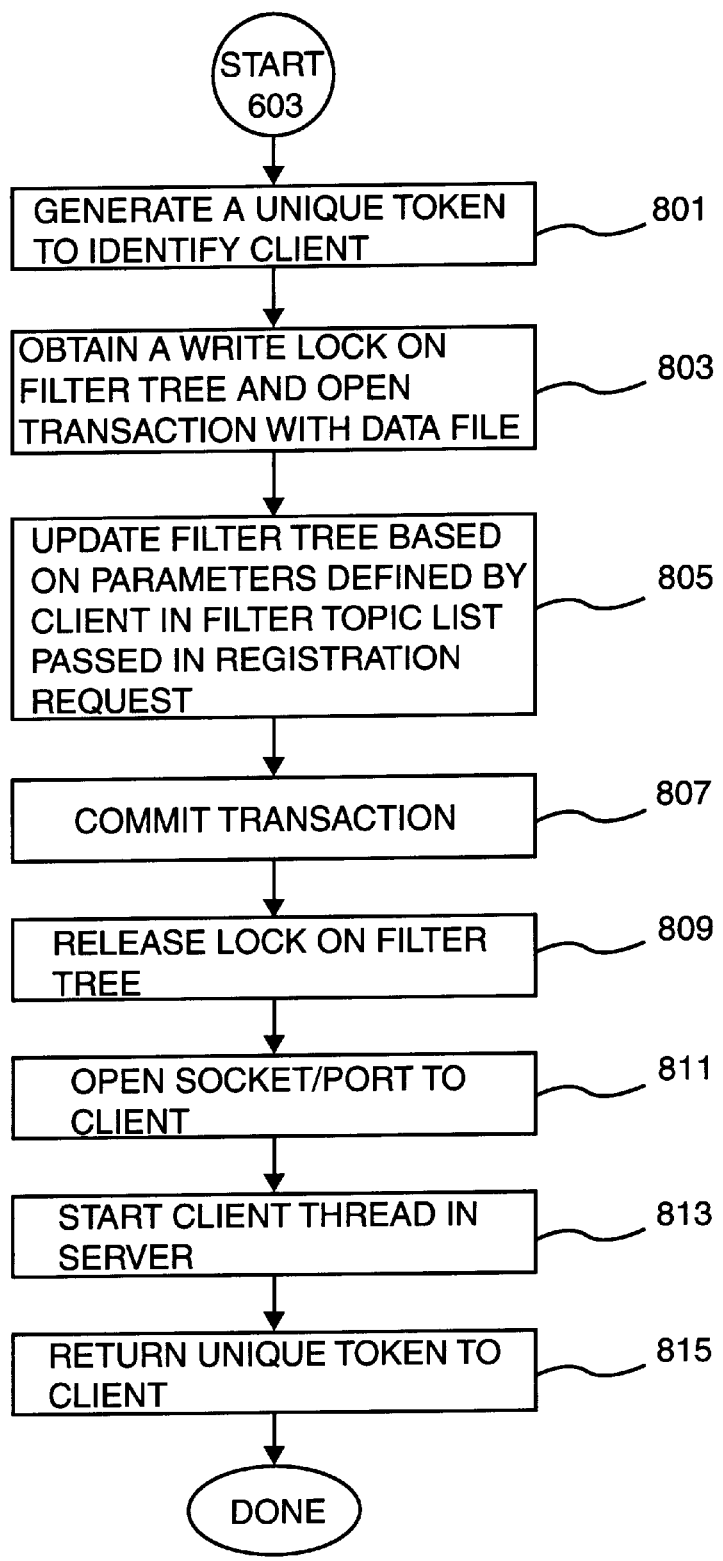
FIG. 8 is a process flow diagram which illustrates the steps associated with handling a request to register a client, i.e., step 603 of FIG. 6, in accordance with an embodiment of the present invention.

Another request that may be received by a server is a request to register a client. FIG. 8 is a process flow diagram which illustrates the steps associated with handling a request to register a client, i.e., step 603 of FIG. 6, in accordance with an embodiment of the present invention. A register client request is a request to register a previously unregistered client with the server, and includes a filter topic list which effectively specifies the "topics," e.g., objects, of interest to the client. The process begins at step 801 where a unique token, e.g., a unique character string, which identifies the client specified in the request is generated by the server. The token is essentially a global token which may be used to uniquely identify the client within the overall client/server system. In one embodiment, the token is used to update a filter tree, such as filter tree 346 of FIG. 3.

In step 803, a write lock associated with the filter tree is obtained by the thread of control, i.e., the current thread, and a transaction is opened with the persistent data file associated with the server. It should be appreciated that the data file generally is in existence. However, in the event that the data file is not in existence, then the data file may be opened. Opening a transaction with the data file, as previously discussed, includes obtaining the write lock associated with the data file.

After the write lock on the filter tree is obtained and the transaction is opened with the data file, the filter tree is updated in step 805 based on parameters defined by the client in the filter topic list passed in the register client, or registration, request. Once the filter tree is updated, a transaction is committed in step 807. In one embodiment, committing the transaction implies that the updated filter tree is saved in the data file and, further, that the write lock associated with the data file is released.

From step 807, process flow moves to step 809 where the write lock on the filter tree is released. Once the write lock on the filter tree is released, a socket or a port i.e., a connection, is opened between the server and the client in step 811 to permit direct communications between the server and the client. In other words, a socket or a port is opened to enable the server and the client to communicate without using an ORB.

A client thread is started on the server in step 813. The client thread is in communication with the client via the socket and, further, references the object list associated with the server. Although any suitable process may generally be used to start the client thread in, or on, the server, one process will be described below with respect to FIG. 12. After the client thread is started, the unique token generated in step 801 is returned to the client in step 815, and the process of handling a register client request is completed. In the described embodiment, the token is returned to the client through the ORB.

Figure 9:
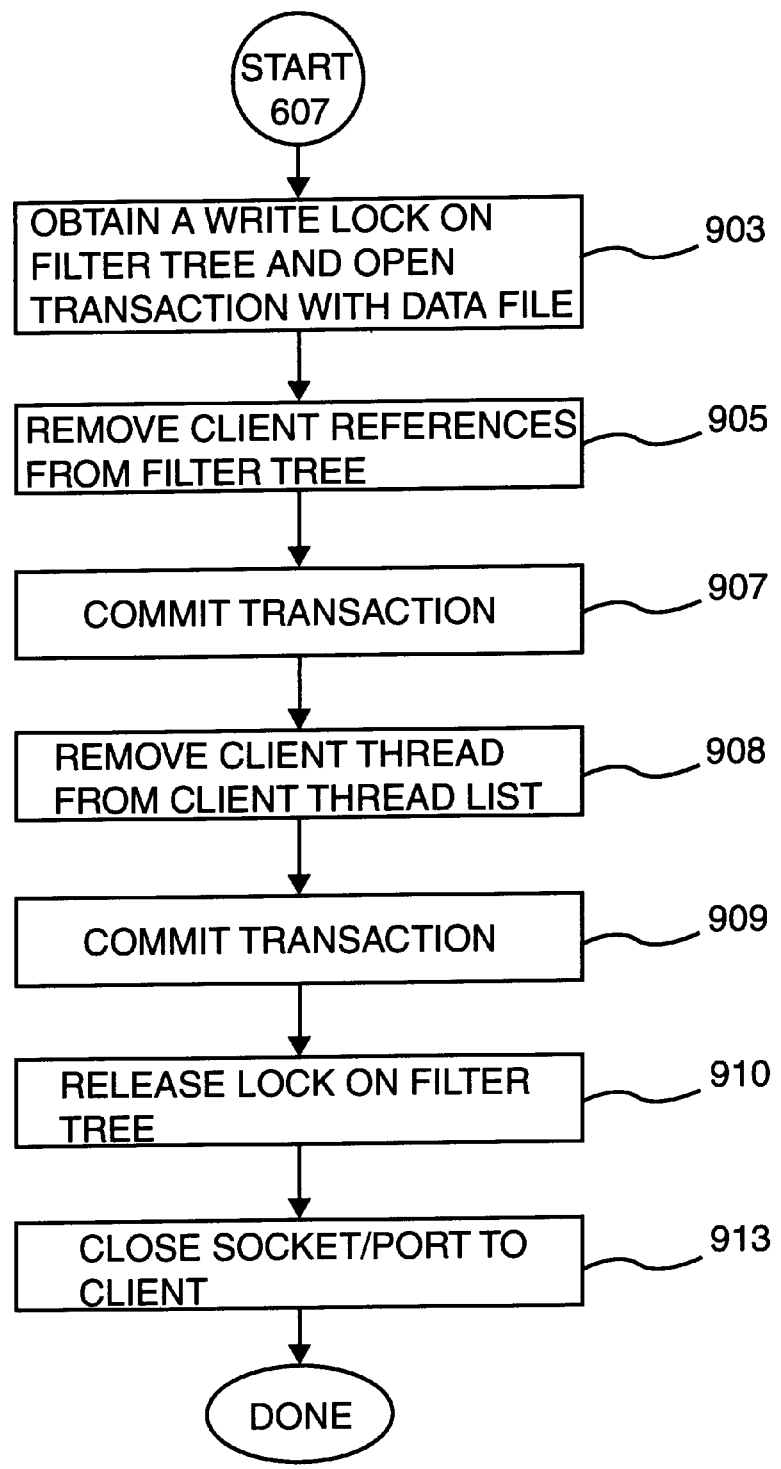
FIG. 9 is a process flow diagram which illustrates the steps associated with handling a request to unregister a client, i.e., step 607 of FIG. 6, in accordance with an embodiment of the present invention.

As previously mentioned, a request received by a server from a client may include a request to unregister a registered client. FIG. 9 is a process flow diagram which illustrates the steps associated with processing a request to unregister a client, i.e., step 607 of FIG. 6, in accordance with an embodiment of the present invention. The process begins at step 903 in which the write lock on the filter tree is obtained, and a transaction is opened with the data file associated with the server. The write lock on the filter tree is obtained in order to allow references to the client, i.e., the client that is to be unregistered, to be removed from the filter tree. In step 905, the client references to the client that is to be unregistered are removed from the filter tree.

Once the client references are removed, the transaction opened in step 903 is committed in step 907. That is, the updated filter tree is written to the data file, and the transaction is closed. After the transaction is committed, the client thread associated with the client that is to be unregistered is removed from the client thread list, which is a typically a persistent list, in step 908. In step 909, the client thread is effectively shut down, and the lock on the filter tree is then released in step 910. Finally, in step 913, the socket or port to the client is closed, and the unregistering of the client is completed.

Figure 10:
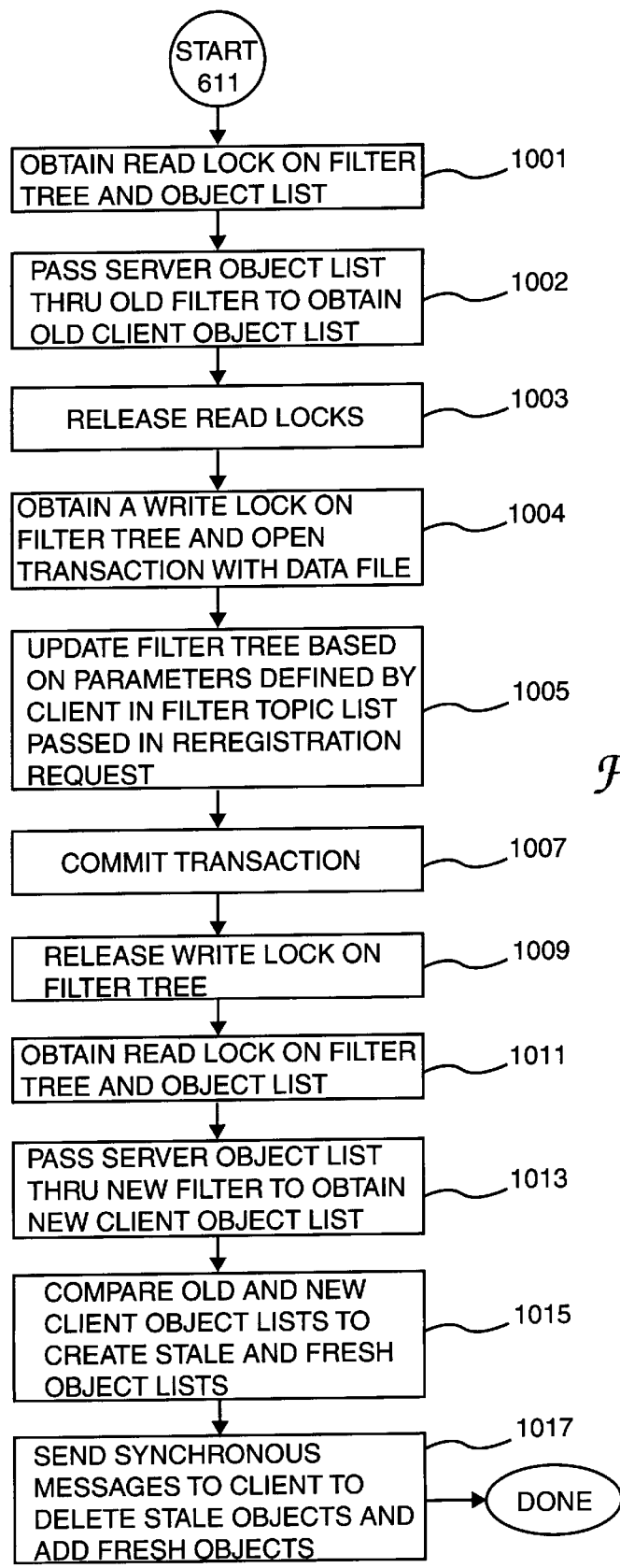
FIG. 10 is a process flow diagram which illustrates the steps associated with handling a request to reregister a client with a server, i.e., step 611 if FIG. 6, in accordance with an embodiment of the present invention.

A request received by a server from a client may also be a request to reregister the client. In general, a request to reregister a client may be is a request to change the filtering topics associated with a client. With reference to FIG. 10, one method of handling a request to reregister a client with a server will be discussed. That is, step 611 if FIG. 6 will be described in accordance with an embodiment of the present invention. The handling a reregister client request begins at step 1001 in which the read lock associated with the filter tree of the server is obtained, in addition the read lock associated with the object list. In one embodiment, the filter tree and the object list each have a read lock and a write lock, although in other embodiments, the filter tree and the object list may each have a single read-write lock. As will be appreciated by those skilled in the art, while a write lock is arranged to prevent more than one thread from altering an entity, e.g., the object list, a read lock is arranged to prevent more than one thread from viewing the entity, e.g., the object list. The read lock may generally be any suitable lock, as for example a semaphore or a mutex lock.

After the read locks on the filter tree and the object list are obtained, the object list, i.e., the server object list, is passed through the old, or existing, filter in order to obtain the old client object list in step 1002. The old client object list, or the client object list that was associated with the client when the client was previously registered, is obtained by identifying objects on the server object list that pass through the old filter. In one embodiment, the old client object list may at least be temporarily stored in computer memory associated with the server. The read locks are released in step 1003, once the old client object list is obtained.

A write lock on the filter tree is obtained in step 1004, and a transaction is opened with the data file associated with the server. The filter tree is then updated in step 1005 based upon the parameters defined by the client in the filter topic list that is passed to the server in the reregistration request. Once the filter tree is updated, the transaction with the data file is committed in step 1007. As previously discussed, committing the transaction effectively includes updating the contents of the data file and closing the transaction, i.e., releasing the write lock associated with the data file.

From step 1007, process flow moves to step 1009 where the lock or, more specifically, the write lock on the filter tree is released. Then, in step 1011, the read lock on the filter tree is obtained, as is the read lock on the object list. After the read locks are obtained, the server object list is passed through the filter, i.e., the new or updated filter, in order to obtain a new client object list in step 1013. In general, the new client object list contains all objects, which are associated with the server, that the client is "interested" in.

A comparison between the old client object list and the new client object list is made in step 1015. By comparing the old and new client object lists, "stale" and "fresh" lists may be generated. A stale object list will generally include objects which were contained in the old client object list, but are not present in the new client object list. A fresh object list may include objects which are included in the new client object list, but were not included in the old client object list.

After the stale object list and the fresh object list are created in step 1015, synchronous messages are sent to the client in step 1017. The synchronous messages are arranged to notify the client to delete stale objects, i.e., those objects in the stale object list, and to add fresh objects, i.e., those objects in the fresh object list. In one embodiment, the synchronous messages are sent to the client through the appropriate client thread. Once the stale objects are deleted and the fresh objects are added, the process of reregistering a client with a server is completed.

Figure 11:
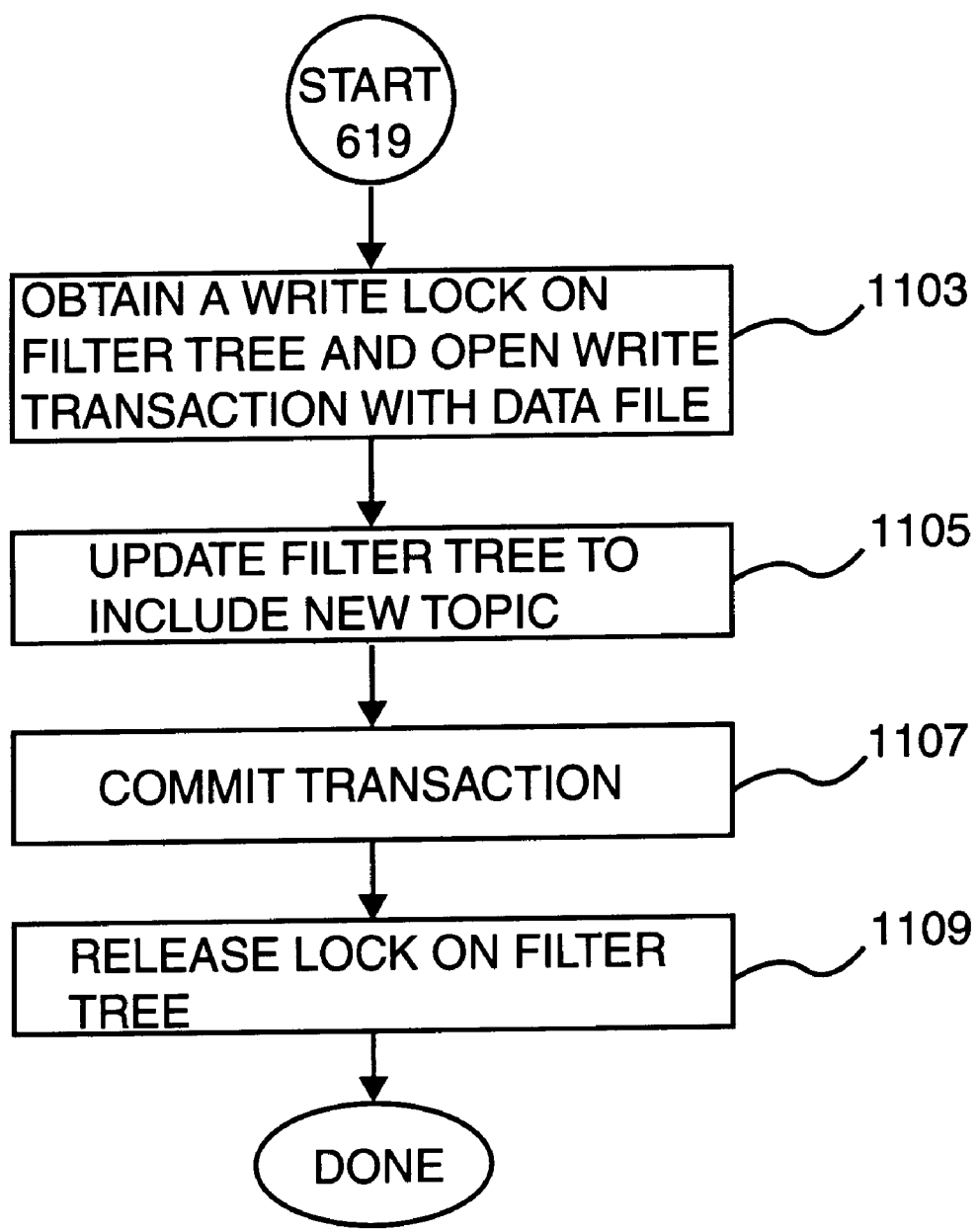
FIG. 11 is a process flow diagram which illustrates the steps associated with handling a request to create a filter topic, i.e., step 619 of FIG. 6, in accordance with an embodiment of the present invention.

A client that is registered with a servant may generally request that the server create a new filter topic for the client, as mentioned above with respect to FIG. 6. Creating a new filter topic allows the client to receive additional information from the server, e.g., information pertaining to an object in which the client previously had no interest. FIG. 11 is a process flow diagram which illustrates the steps associated with handling a request to create a filter topic, i.e., step 619 of FIG. 6, in accordance with an embodiment of the present invention. The process begins at step 1103 in which a write lock on the filter tree is obtained, and a transaction is opened with a data file, e.g., a persistent data file associated with the server.

After the write lock to the filter tree is obtained, the filter tree is then updated in step 1105 to include a new filter topic specified in the create filter topic request. Once the filter tree is updated, the transaction with the data file is committed in step 1107, and the write lock on the filter tree is released in step 1109. When the write lock on the filter tree is released, the process of handing a create filter topic request is completed.

Figure 12:
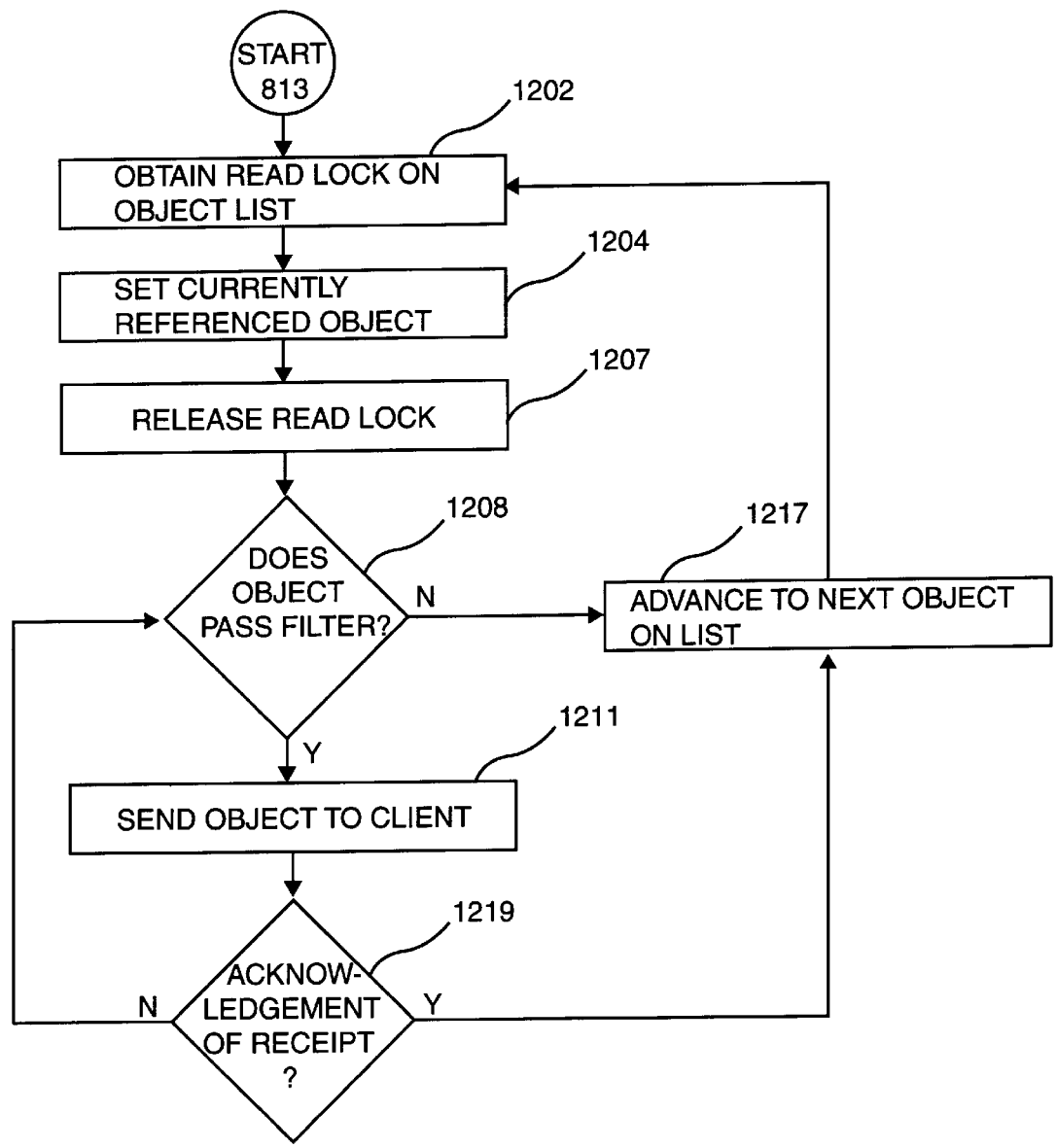
FIG. 12 is a process flow diagram which illustrates the steps associated with starting a client thread in the server, i.e., step 813 of FIG. 8, in accordance with an embodiment of the present invention.

In general, when a client is registered with a server, a client thread that is associated with the client is started in the server. By starting the client thread, the server is then able to communicate directly with the client, without communication through an ORB. With reference to FIG. 12, the steps associated with starting a client thread in a server, i.e., step 813 of FIG. 8, will be described in accordance with an embodiment of the present invention. In other words, the functionality of the client thread will be discussed. The process of starting a client thread in the server begins at step 1202 where a read lock associated with the object list, i.e., the server object list, is acquired. By obtaining the read lock, the thread of control, e.g., the client thread, is allowed to view the objects in the object list.

The client thread sets the currently referenced object in the object list in step 1204. That is, the client thread looks at the object which it is pointing to in the object list and sets that object as the currently referenced object. After the currently referenced object is set, the read lock associated with the object list is released in step 1207. It should be appreciated, however, that the read lock may generally be released at any time after the currently referenced object is set. The currently referenced object is then checked against a filter associated with the client thread or, more specifically, the client that is in communication with the client thread, and a determination is made in step 1208 as to whether the currently referenced object passes the filter. In other words, a determination is made regarding whether the object is of interest to the client associated with the client thread. When it is determined that the object passes the filter, i.e., that the object is of interest to the client associated with the client thread, the currently referenced object is sent to the client in step 1211. More specifically, an attempt is made to send the object to the client. In one embodiment, the currently referenced object is serialized and streamed over the socket that connects the server and the associated client, i.e., the serialized object is streamed from the server to the client.

A determination is made in step 1219 regarding whether the server has acknowledged receipt of the currently referenced object, typically within a given period of time. The given period of time, in general, may vary. If the determination in step 1219 is that an acknowledgment was received, then the indication is that any updates associated with the referenced object have effectively been received by the server. Accordingly, process flow proceeds to step 1217 where the client thread is advanced to the next object in the object list. When the client thread references the last object in the object list, the next object on the object list may be the first object in the list. After the client thread is advanced to the next object, process flow returns to step 1202 in which the read lock associated with the object list is obtained.

Alternatively, if the determination in step 1219 is that an acknowledgment was not received, then the implication is that the streamed object was not received by the client. When no acknowledgment is received, in the described embodiment, process flow returns to step 1208 where a determination is made as to whether the object passes the filter.

Returning to step 1208, if it is determined that the currently referenced object does not pass the filter, the indication is that the currently referenced object is not an object that is of interest to the client associated with the client thread. Hence, when the currently referenced object does not pass the filter, process flow moves to step 1217 in which the client thread is advanced to the next object on the object list.

Figure 13:
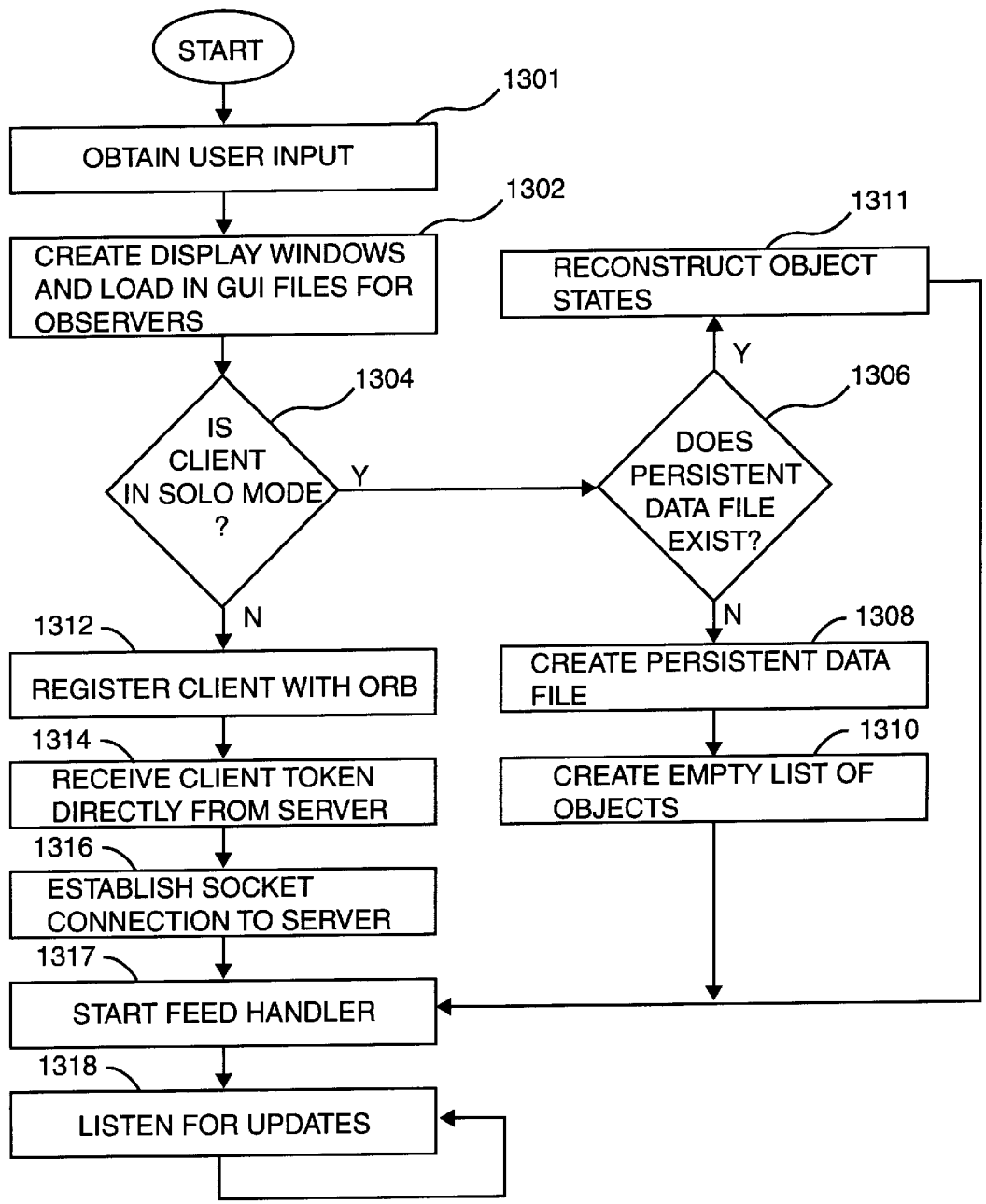
FIG. 13 is a process flow diagram which illustrates the steps associated with starting up a client in accordance with an embodiment of the present invention.

In the described embodiment, when a client is started up, the client is generally started up, e.g., instantiated, in response to a request from a user. By way of example, the user may interact with a part of a situation display in such a manner as to cause the start up of a client to be requested. FIG. 13 is a process flow diagram which illustrates the steps associated with starting up a client in accordance with an embodiment of the present invention. The process of starting up a client begins at step 1301 where user input is obtained. In other words, a client, which is currently not actively in communication with a server receives a command from a user to effectively start up. Once the user input is obtained, display windows are created in step 1302, and any graphical user interface files are loaded for observers which are linked with the client. A determination is then made in step 1304 as to whether the client is operating in solo mode, or is otherwise not functioning as part of a client/server computing network.

When it is determined in step 1304 that the client is not in solo mode, then the indication is that the client is in network mode. Accordingly, process flow moves from step 1304 to step 1312 where the client is registered with an ORB to allow the client to communicate with appropriate servers. In general, registering the client with the ORB will cause the ORB to contact a server and, further, may result in the start up of the server, as was described above with respect to FIG. 5. Although the parameters sent by the client to the ORB in order to register itself with the ORB may vary widely, in one embodiment, the parameters may include a filter list.

After the client is registered with the ORB, the client receives a client token, or an identifier that uniquely identifies the client, directly from the server in step 1314. Then, in step 1316, a socket connection is established with the server in step 1316, and the feed handler associated with the client is started in step 1317. In general, the feed handler is established to handle messages from handlers and to provide the client with updates in the event that the server is off-line. One method which is suitable for use in the start up of the feed handler will be discussed below with reference to FIG. 18.

Once the feed handler is started up to handle messages to the client, process flow proceeds to step 1318 where the client listens for updates. The updates may come from the server, as well as from the feed handler. The steps associated with listening for updates will be described below with reference to FIG. 14. In general, the client continues to listen for updates until the client goes off-line, as will be appreciated by those skilled in the art.

Returning to the determination of whether the client is in solo mode in step 1304, when it is determined that the client is in solo mode, then process flow moves from step 1304 to step 1311 where a determination is made regarding whether a persistent data file is in existence. Specifically, in the described embodiment, it is determined if a persistent data file which is in communication with the client exists. The persistent data file is generally arranged to store object information which may be used to reconstruct object states, if necessary.

If it is determined in step 1306 that a persistent data file does exist, then the contents of the persistent data file are used in step 1311 to reconstruct object states for objects associated with the client. Reconstructing object states may include creating a client object list. Once the object states are reconstructed, then the feed handler associated with the client is started in step 1317.

Alternatively, if the determination in step 1306 is that a persistent data file does not exist, a persistent data file is created in step 1308 using any suitable method. After the persistent data file is created, an empty list of objects is created in step 1310. Typically, the empty list of objects, i.e., the empty client object list, is created in the client. In one embodiment, the empty list of objects may take the form of a persistent hash table, although the format of the list may vary widely. From step 1310, process flow moves to step 1317 where the feed handler is started.

Figure 14:
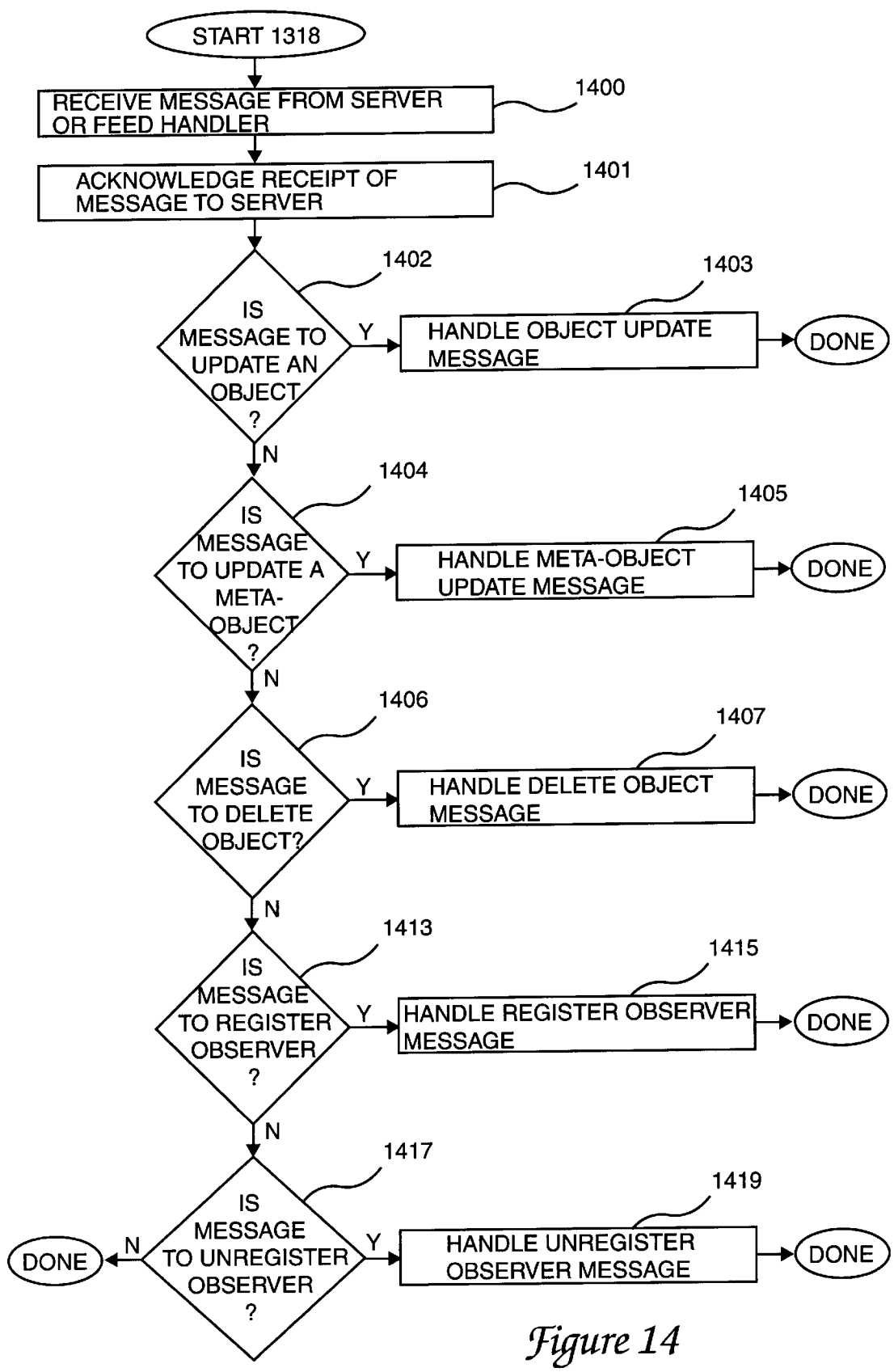
FIG. 14 is a process flow diagram which illustrates the steps associated with a client listening for updates from a server, i.e., step 1318 of FIG. 13, in accordance with an embodiment of the present invention.

When a client is started up, e.g., registered with a server, the client is effectively initialized to listen for updates from the server, or from a feed handler associated with the client. FIG. 14 is a process flow diagram which illustrates the steps associated with a client listening for updates from a server or a feed handler, i.e., step 1318 of FIG. 13, in accordance with an embodiment of the present invention. Listening for updates, in general, involves awaiting any message from the server which requires the client to be updated. The process begins at step 1400 where a message is received, by the client, from either a server or a feed handler. Once the message is received, if the message is received from a server, an acknowledgment of the receipt of the message is sent to the server in step 1401.

After acknowledgment of the receipt of the message is sent to the server, a determination is made in step 1402 as to whether the message is a message to update an object on the client. In general, a message to update an object on the client may include such information as the name of the object, identifiers pertaining to other objects which may reference the object that is to be updated, and a class name for the handler class associated with the object. When it is determined that the message is an object update message, then process flow moves to step 1403 in which the object update message is handled. The steps associated with handling the object update message will be described below with reference to FIG. 15. Once the object update message is handled, the steps associated with listening for updates is allowed to continue. In other words, the client continues to listen for updates.

Alternatively, if the determination in step 1402 is that the message is not an object update message, then in step 1404, a determination is made regarding whether the message is a message to update a meta-object. As previously mentioned, a meta-object is an object that does not have a physical representation and effectively serves as a factory for the creation of new objects. If it is determined that the message is a meta-object update message, then in step 1405, the meta-object update message is handled. The steps associated with handling the meta-object update message will be discussed below with respect to FIG. 16. After the meta-object update message is processed, then the client is allowed to continue to listen for updates.

If the determination in step 1404 is that the message is not a meta-object update message, then it is determined in step 1406 whether the message is a delete object message. In other words, a determination is made as to whether the server is requesting that an object associated with the client be deleted. If the determination is that the message is a delete object message, then the delete object message is handled in step 1407. One method of handling the delete object message will be described below with reference to FIG. 17. Once the delete object message is handled, the client continues to listen for updates.

When the determination in step 1406 is that the message is not a delete object message, then in step 1413, a determination is made regarding whether the message is a message, or request, to register an observer with the client. As mentioned above, an observer may be any suitable sub-system which accesses the client and is a part of a situation display system. By way of example, the observer may be a planning matrix or a map. If the message is a register observer message, process flow moves from step 1413 to step 1415 where the register observer message is handled. As will be appreciated by those skilled in the art, registering an observer with the client may occur using substantially any suitable method. After the register observer message is process, the client continues to listen for update messages.

Alternatively, when it is determined in step 1413 that the message is not a register observer message, a determination is made in step 1417 as to whether the message is a message to unregister a previously registered observer. If it is determined that the message is an unregister observer message, then the unregister observer message is handled in step 1419. In general, unregistering the observer may involve removing all references to the observer from the client. When the unregister observer message has been processed, the client is allowed to continue to listen for update messages.

In the described embodiment, if the determination in step 1417 is that the message is not an unregister observer message, then the indication is that the message is not a valid update message. However, it should be appreciated that typically, the message will essentially either be an update object message, an update meta-object message, a delete object message, a register object message, or an unregister observer message.

Figure 15:
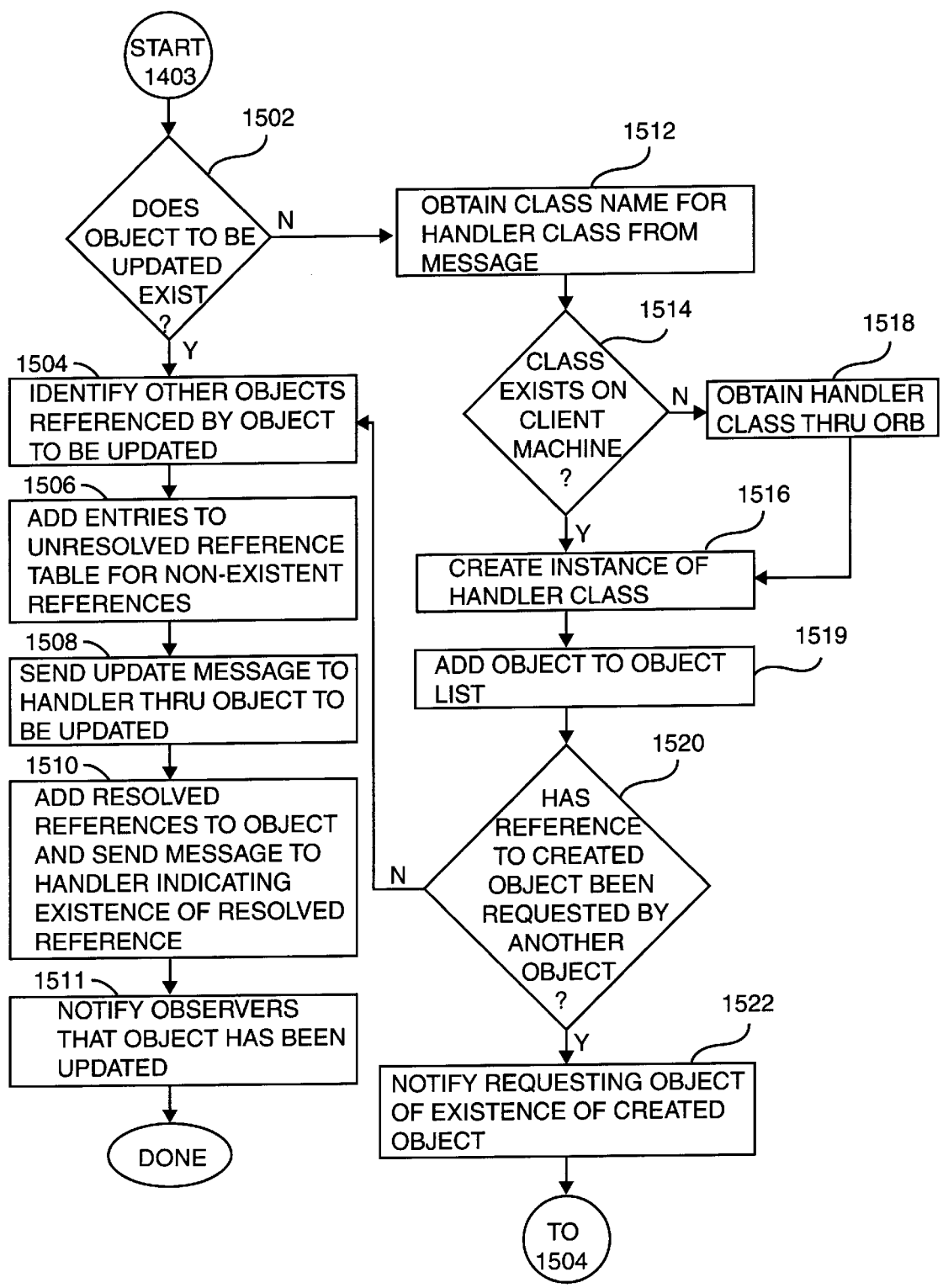
FIG. 15 is a process flow diagram which illustrates the steps associated with handling an object update message, i.e., step 1403 of FIG. 14, in accordance with an embodiment of the present invention.

With reference to FIG. 15, the steps associated with handling an object update message, i.e., step 1403 of FIG. 14, will be described in accordance with an embodiment of the present invention. The process begins at step 1502 where a determination is made as to whether the object that is to be updated exists. In other words, a determination is made regarding whether the object specified in the object update message exists on the client. If it is determined that the object exists, then in step 1504, all objects referenced by the object that is to be updated are identified. Once the referenced objects are identified, entries are added in step 1506 to a reference table of unresolved entries, e.g., an unresolved reference table, for non-existent references which were specified in the object update message. In one embodiment, any nonexistent references that are already in the unresolved reference table may be purged prior to adding the "new" entries to the unresolved reference table. It should be appreciated that in some cases, there may be not non-existent references, e.g., object references, in which case step 1506 may be bypassed.

An update message is sent in step 1508 from the object that is to be updated to the handler associated with the object. The update message may notify the handler that the object is to be updated, as for example by the handler. After the update message is sent, then substantially all resolved references that were specified in the object update message are added to the object in step 1510. In addition, a message is sent to the handler associated with the object to indicate the existence of the resolved references. Update notifications are then sent to observers which are in communication with the client in 1511. In other words, messages which indicate that the object has been updated are generally sent to each observer which is associated with the client. Typically, an object reference associated with the updated object is included in the notifications. Once the notifications are sent, then the steps associated with handling an object update message are completed. As will be appreciated by those skilled in the art, observers may respond to the notifications. Further, observers are generally arranged to incorporate and process the updated object information.

Returning to step 1502, if the determination is that the object which is to be updated does not exist, then the class name associated with the handler class of the object is obtained in step 1512 from the object update message. In step 1514, a determination is made as to whether the class associated with the class name is in existence on the client machine, i.e., the machine on which the client is resident. If it is determined that the class exists on the client machine, then an instance of the handler class is created in step 1516. That is, a new object is created using the handler class identified by the class name.

Once the instance of the handler class is created, the new object is added to the object list, i.e., the client object list, in step 1519. One method of adding an object to the client object list will be described below with reference to FIG. 21. After the object is added to the object list, it is determined in step 1520 whether a reference to the new, or created, object has been requested by another object. In one embodiment, such a determination may be made by traversing the unresolved reference table. If the determination is that a reference to the created object has been requested by another object, then the requesting object is notified of the existence of the created object in step 1522, and process flow returns to step 1504 in which substantially all objects referenced by the object to be updated, e.g., the created object, are identified. Alternatively, if the determination in step 1520 is that another object has not requested a reference to the object created in step 1516, then in one embodiment, process flow returns directly to step 1504 where the objects which reference the created object, or the object to be updated, are identified.

Returning to step 1514, when it is determined that the class identified by the class name specified in the update object message is not in existence on the client machine, then the class, e.g., the handler class, is obtained through the ORB in step 1518. In other words, the handler class may be obtained from another client or a server that is associated with the ORB. Once the handler class is obtained, an instance of the handler class is created in step 1516.

Figure 16:
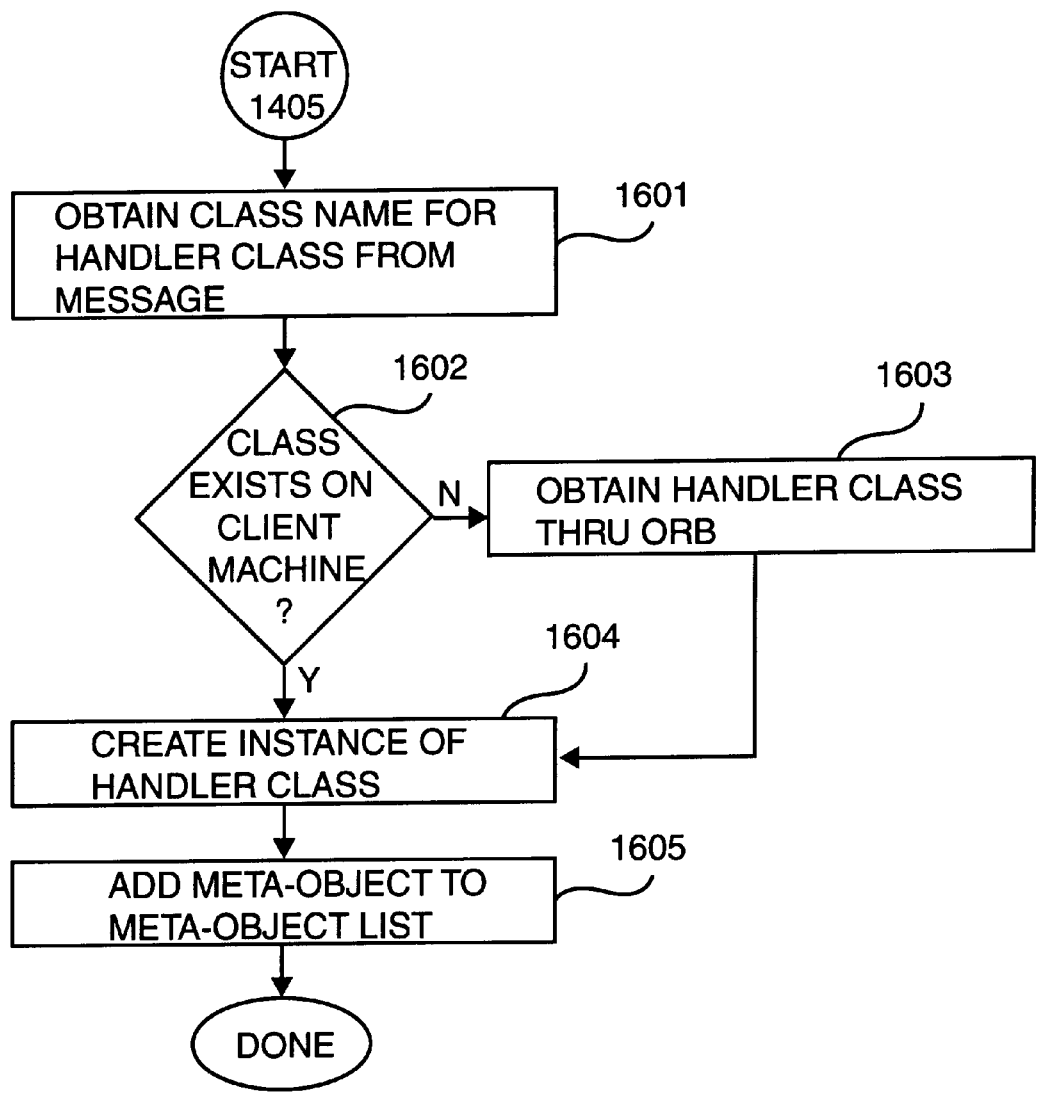
FIG. 16 is a process flow diagram which illustrates the steps associated with handling a meta-object update message, i.e., step 1405 of FIG. 14, in accordance with an embodiment of the present invention.

A message received by a client, as mentioned above with respect to FIG. 14, may also include a message to update a meta-object. FIG. 16 is a process flow diagram which illustrates the steps associated with handling a meta-object update message, i.e., step 1405 of FIG. 14, in accordance with an embodiment of the present invention. The process of handling a meta-object update message begins at step 1601 in which the class name associated with the handler class of the meta-object is obtained in from the meta-object update message. In general, it should be appreciated that the meta-object update message includes a class name for the handler class of the meta-object that is to be updated.

After the class name for the handler class is obtained from the meta-object update message, then in step 1602, a determination is made as to whether the class associated with the class name is in existence on the client machine. If it is determined that the class exists on the client machine, then an instance of the handler class is created in step 1604. That is, a meta-object is created using the handler class identified by the class name. Once created, the meta-object is then added in step 1605 to the meta-object list associated with the client, and the process of handling a meta-object update message is completed. The steps associated with adding a meta-object to a meta-object list are similar to the steps associated with adding an object to an object list, which will be described below with respect to FIG. 21. When the meta-object is added to the meta-object list, the process of updating a meta-object is completed.

Returning back to step 1602, if it is determined that the handler class specified by the class name does not exist on the client machine, then process flow proceeds to step 1603 where the appropriate handler class is obtained through the ORB using substantially any suitable method. After the appropriate handler class is obtained, then in step 1604, an instance of the handler class is created. In other words, a meta-object is created from the handler class.

In general, a new meta-object overwrites an associated old meta-object, or otherwise updates the old meta-object. The use of meta-objects generally permits objects which contain calls to classes which are not local to be properly displayed. That is, by using meta-objects, since meta-objects contain information concerning needed classes, a request may be sent from a client through an ORB to a server in order to provide the local machine, e.g., the client machine, with the missing classes. Hence, new objects may be dynamically incorporated for use and readily sent to appropriate client machines.

Figure 17:
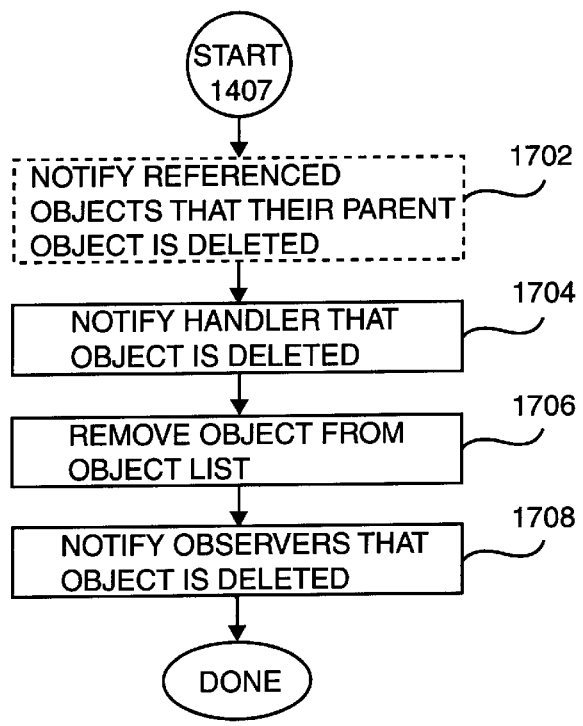
FIG. 17 is a process flow diagram which illustrates the steps associated with handling a delete object method, i.e., step 1407 of FIG. 14, in accordance with an embodiment of the present invention.

FIG. 17 is a process flow diagram which illustrates the steps associated with handling a delete object method, i.e., step 1407 of FIG. 14, in accordance with an embodiment of the present invention. In the described embodiment, the process begins at step 1702 in which a deletion notification is sent to all objects which are referenced by the object that is to be deleted. That is, a deletion notification may be sent to all "children" of the object to be deleted. Step 1702 is an optional step, and, hence, may be eliminated in some embodiments.

Once notification is sent to the referenced objects that their parent is effectively deleted, a notification is sent in step 1704 to the handler associated with the object. Such a notification typically apprises the handler of the fact that the object is deleted. As will be understood by those of skill in the art, the handler is generally arranged to reallocate the resources associated with the deleted object. After the handler is notified of the deletion of the object, the object is removed from the object list in step 1706. Then, in step 1708, substantially all observers which are associated the client are notified that the object is deleted, and the process of handling a delete object request is completed.

Figure 18:
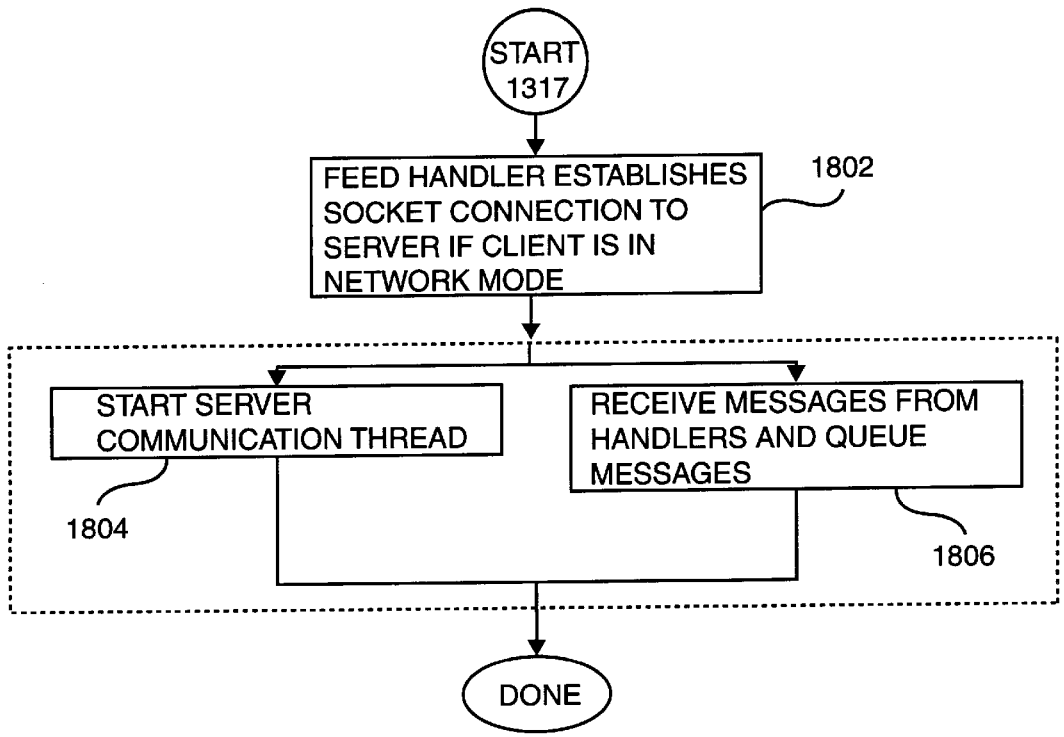
FIG. 18 is a process flow diagram which illustrates the steps associated with the start up of a feed handler, i.e., step 1317 of FIG. 13, in accordance with an embodiment of the present invention.

As mentioned above with respect to FIG. 13, when a client is started up, the feed handler associated with the client is also started up. Referring next to FIG. 18, the steps associated with the start up of a feed handler will be described. That is, one embodiment of step 1317 of FIG. 13 will be described in accordance with the present invention. The feed handler is arranged to interface with a user interface, as for example a graphical user interface, using handlers in order to obtain messages that are intended for an associated client. In addition, the feed handler is arranged to maintain a queue of messages intended for a server, when the server is in communication with the client. The process of starting a feed handler begins at step 1802 where the feed handler establishes a connection with the server if the client is in network mode. In other words, if the client is in communication with a server, then the feed handler establishes its own socket connection to the server.

Once the socket connection is established as appropriate, process flow moves to both step 1804, where a server communication thread is started, and step 1806, where the feed handler receives as well as queues messages from handlers. The starting of the server communication thread, which will be described below with reference to FIG. 19, and the receiving of messages occur substantially simultaneously, as they are concurrent processes. The server communication thread is generally arranged to process messages queued on the feed handler. While the server communication thread processes the queued messages, messages that are received from handlers are queued on the feed handler. Messages typically continue to be queued, and the server communication thread continues to process the queued messages, until the feed handler is effectively taken off-line, as for example when the client is taken off-line, as will be appreciated by those skilled in the art.

Figure 19:
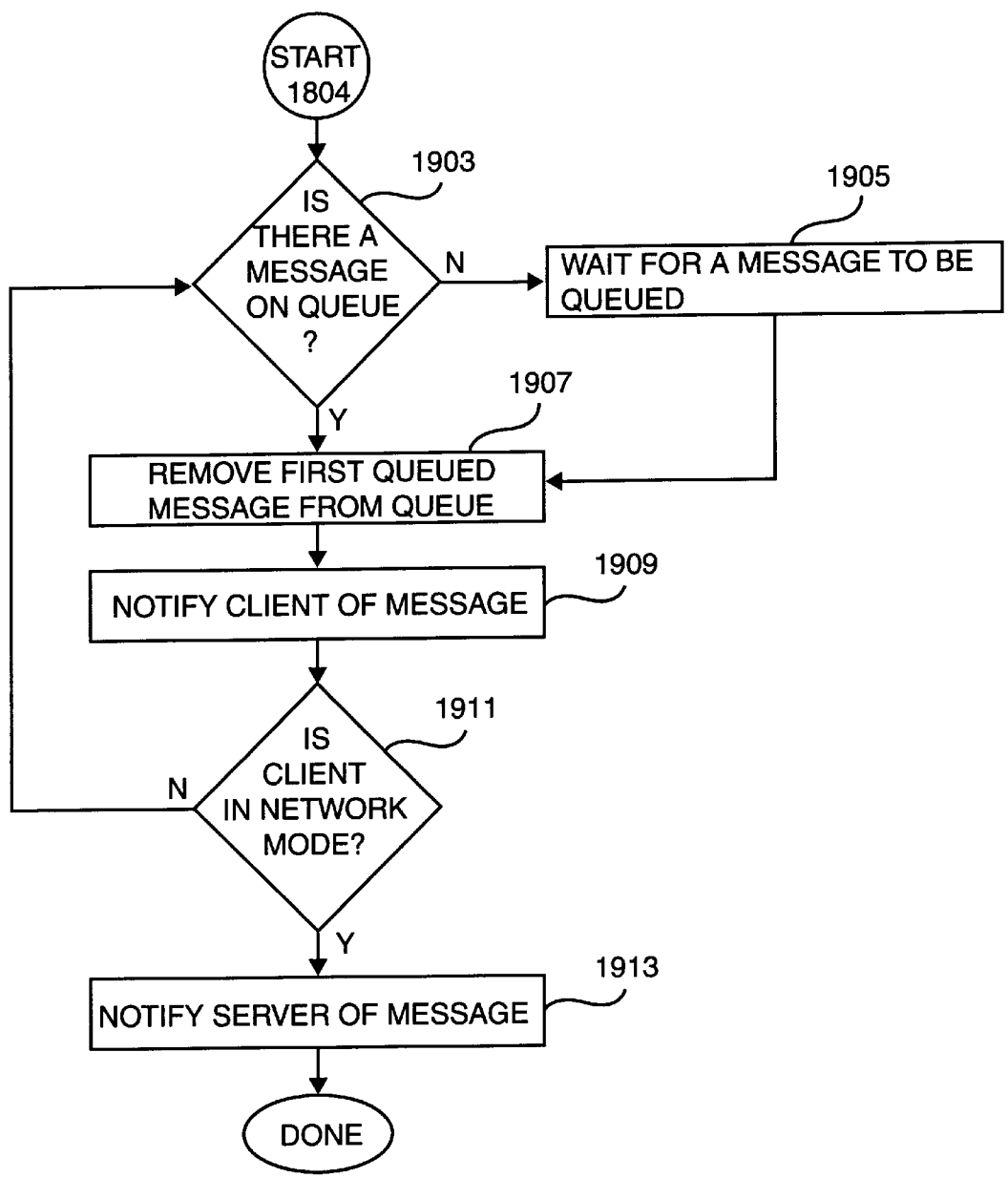
FIG. 19 is a process flow diagram which illustrates the steps associated with starting a server communication thread on a client, i.e., step 1804 of FIG. 18, in accordance with an embodiment of the present invention.

FIG. 19 is a process flow diagram which illustrates the steps associated with starting a server communication thread on a client, i.e., step 1804 of FIG. 18, in accordance with an embodiment of the present invention. The process begins at step 1903 in which a determination is made regarding whether there is a message on the queue or, more specifically, on the feed handler queue. If it is determined that there is a message, or more than one message, on the queue, then process flow moves from step 1903 to step 1907 where the first message in the queue is removed. Although the "first message" in the queue may either be the oldest message in the queue or the newest message in the queue, in the described embodiment, the first message is the oldest message in the queue. That is, messages are removed from the queue in a first-in-first-out (FIFO) manner.

After the first queued message is removed from the queue in step 1907, the client is notified of the message in step 1909. It should be appreciated that when the client is notified of a message, the client may generally process the message as appropriate. Once the client is notified of the message, a determination is made in step 1911 as to whether the client is in network mode. If the determination is that the client is in network mode, then the indication is that the client is in communication with a server. Accordingly, process flow moves from step 1911 to step 1913 where the server is notified of the message, i.e., the message removed from the queue in step 1907. The steps associated with notifying a server of a message will be discussed below with respect to FIG. 22. When the server is notified of the message, process flow then returns to step 1903 where a determination is made regarding whether there is another message on the queue associated with the feed handler.

Alternatively, if it is determined in step 1911 that the client is not in network mode, then the client is in solo mode, and is not in communication with a server. As such, process flow moves from step 1911 to step 1903 in which it is determined whether there is a message on the queue.

Referring back to step 1903, if it is determined that there is no message in the queue, then the queue is effectively empty. As such, the server communication thread waits for a message to be queued in step 1905. In one embodiment, the server communication thread remains in a wait state until it receives notification, e.g., from the feed handler, that a message has been queued. Once a message has been queued, then process flow moves to step 1907 where the queued message is removed from the queue.

Figure 20:
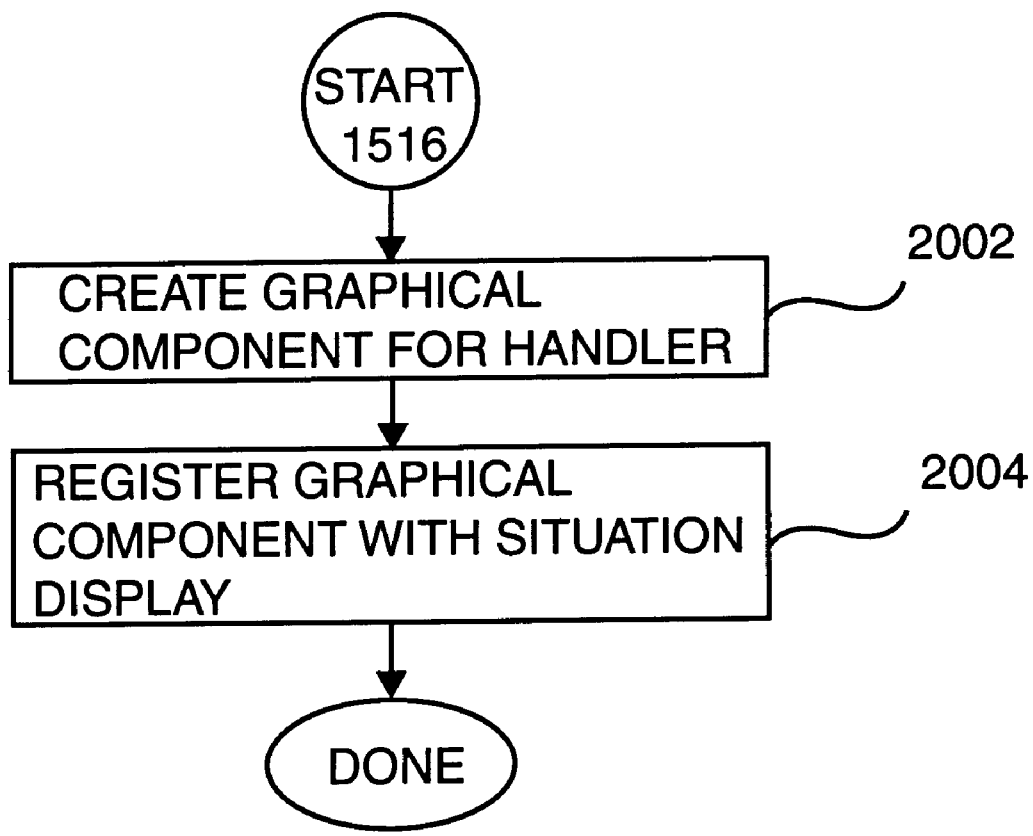
FIG. 20 is a process flow diagram which illustrates the steps associated with creating an instance of a handler class, i.e., step 1516 of FIG. 15, in accordance with an embodiment of the present invention.

With reference to FIG. 20, the steps associated with creating an instance of a handler class, i.e., step 1516 of FIG. 15, will be described in accordance with an embodiment of the present invention. A handler class is typically associated with creating and registering a graphical component for an object. It should be appreciated that although the functions performed by a handler class, or a handler, may be widely varied, the functions often include the ability to create an icon, as for example an icon on a map. Further, in the described embodiment, the graphical component of a handler is arranged to convert updates from the server to the client into information that the client may use. In other words, the handler is arranged to interpret information from a server. Although handlers typically have a graphical component, it should be appreciated that some handlers may not have a graphical component.

In the described embodiment, the process of creating an instance of a handler class begins at step 2002 where a graphical component, or representation, for the handler is created. By way of example, an icon may be created. Once the graphical component is created, then the graphical component is registered with the overall situation display in step 2004. After the graphical component is registered, the creating of an instance of a handler class is effectively completed.

Figure 21:
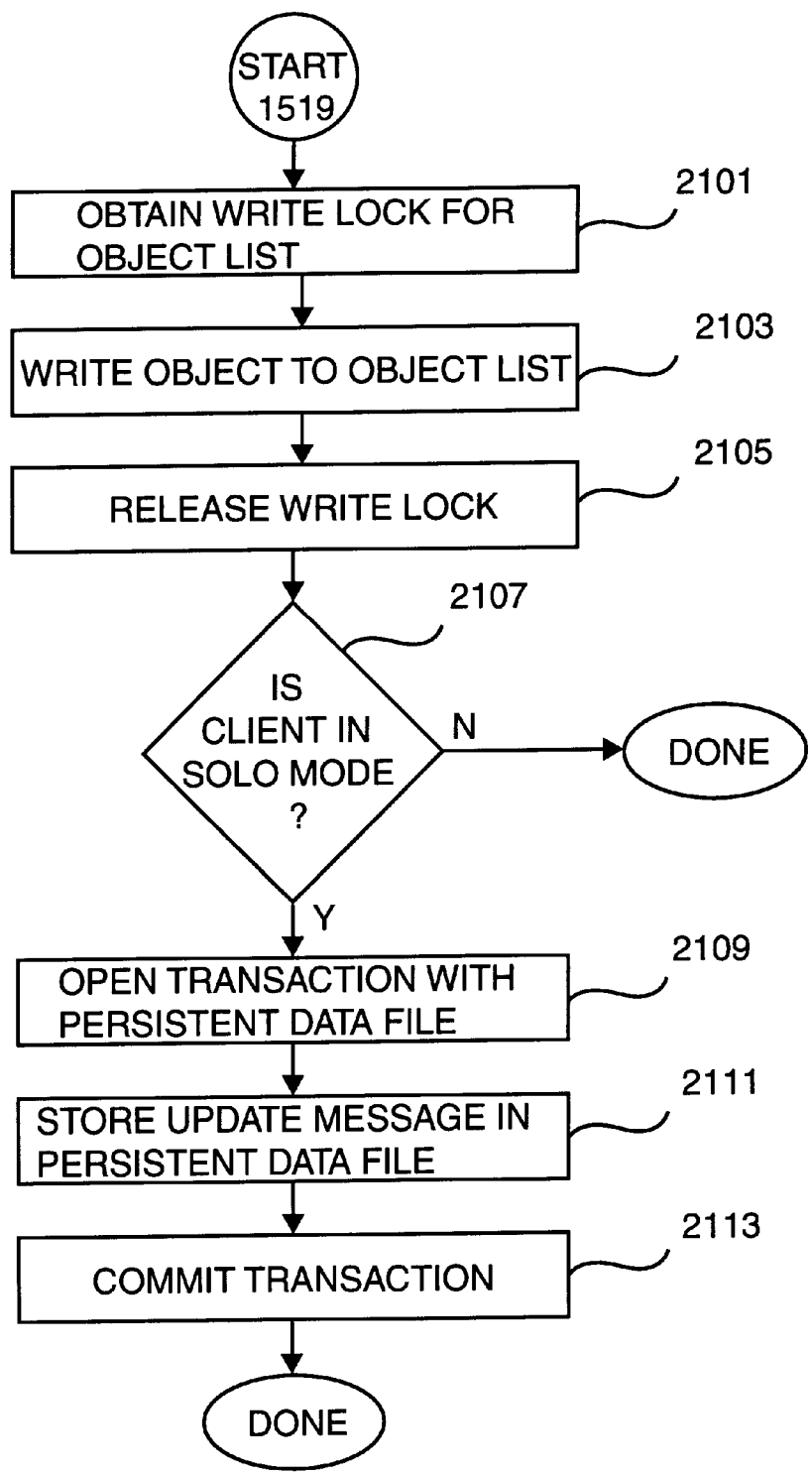
FIG. 21 is a process flow diagram which illustrates the steps associated with adding an object to an object list, i.e., step 1519 of FIG. 15, in accordance with an embodiment of the present invention.

As mentioned above with respect to FIG. 15, objects may be added to an object list in a client in response to an object update message. FIG. 21 is a process flow diagram which illustrates the steps associated with adding an object to an object list, i.e., step 1519 of FIG. 15, in accordance with an embodiment of the present invention. The process begins at step 2101 where a write lock for the object list, i.e., the client object list is obtained. It should be understood that the write lock is obtained by the thread of control which, in one embodiment, is a message handling thread. After the write lock for the object is obtained, the object is written to the object list in step 2103. Writing the object to the object list generally entails appending the object to the end of the object list. Once the object is written to the object list in step 2103, the write lock is released by the thread of control in step 2105.

A determination is made in step 2107 regarding whether the client is operating in solo mode. In other words, it is determined if the client is not part of a network, or is otherwise not in communication with a server. If it is determined that the client is operating in solo mode, then a transaction is opened with a persistent data file that is associated with the client in step 2109. Opening the transaction generally includes obtaining a write lock on the persistent data file. In step 2111, the update message is stored in, or written into, the persistent data file. Then, in step 2113, the transaction with the persistent data file is committed, and the process of adding an object to a client object list is completed.

Referring back to step 2107, if it is determined that the client is not in solo mode, then the indication is that the client is operating in network mode. As such, once the object is written to the object list in step 2103, an associated update message does not need to be stored to a persistent data file for later use. Accordingly, if the determination in step 2107 is that the client is operating in network mode, the process of adding an object to a client object list is completed.

Figure 22:
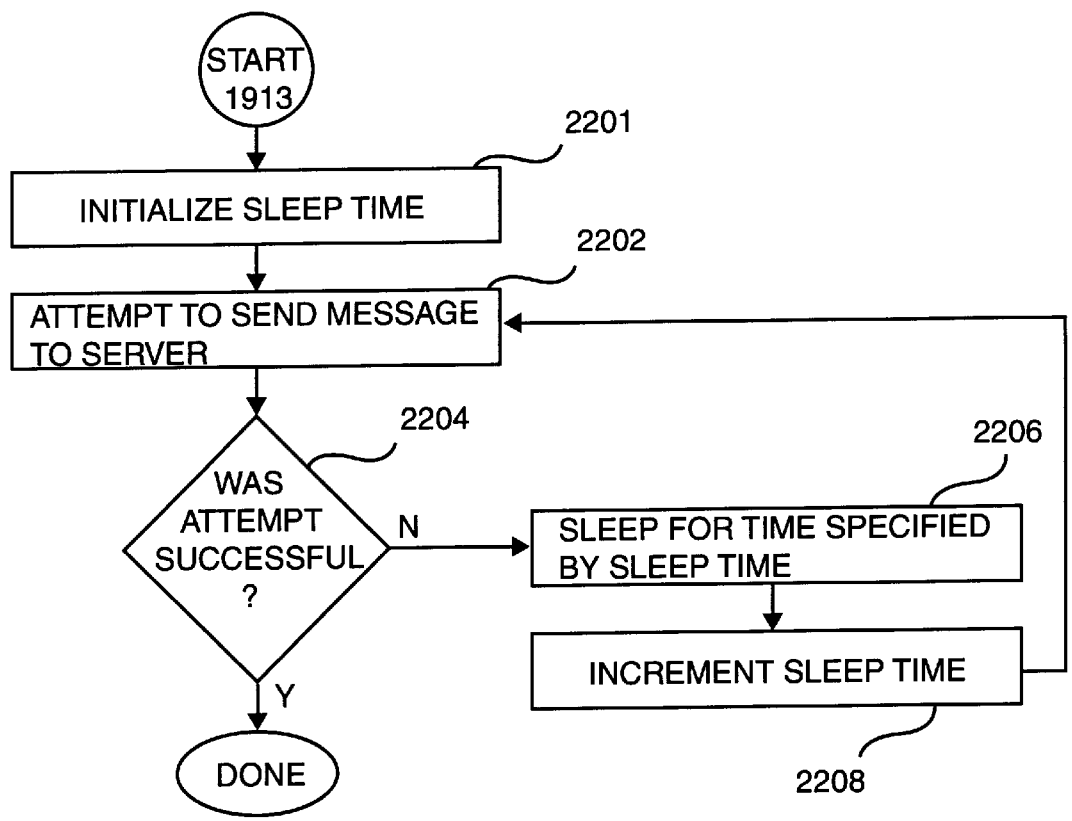
FIG. 22 is a process flow diagram which illustrates the steps associated with notifying the server of a message, i.e., step 1913 of FIG. 19, in accordance with an embodiment of the present invention.

FIG. 22 is a process flow diagram which illustrates the steps associated with notifying the server of a message, i.e., step 1913 of FIG. 19, in accordance with an embodiment of the present invention. The process begins at step 2201 where a sleep time is initialized. A sleep time is typically a predetermined amount of time which is allowed to elapse between different attempts to send a message, as for example a message to a server. That is, the sleep time is the amount of time the thread of control sleeps between attempts to send a message.

After the sleep time is initialized, an attempt is made to send a message to a server in step 2202. In other words, the client attempts to notify the server of a message. A determination is then made in step 2204 as to whether the attempt to send the message to the server was successful. In one embodiment, the determination regarding whether the attempt to send the message to the server was successful may involve determining whether an acknowledgment receipt was received from the server. If the determination is that the attempt was successful, then the server is considered to be successfully notified of the message.

Alternatively, when it is determined that the attempt to send the message to the server was not successful, e.g., when no acknowledgment is received from the server within a given amount of time, process flow moves from step 2204 to step 2206. In step 2206, the thread of control is put to sleep for the amount of time specified by the sleep time. Then, the sleep time is incremented in step 2208. Incrementing the sleep time allows the amount of time between attempts at sending a message to a server to be varied. After the sleep time is incremented, another attempt to send a message to the server is made in step 2202. It should be appreciated that in some embodiments, the number of attempts at sending a message to a server may be limited, i.e., only a certain number of attempts may be made before the attempts to notify the server of the message are aborted. In other embodiments, attempts may be made until the server is successfully notified.

Figure 23:
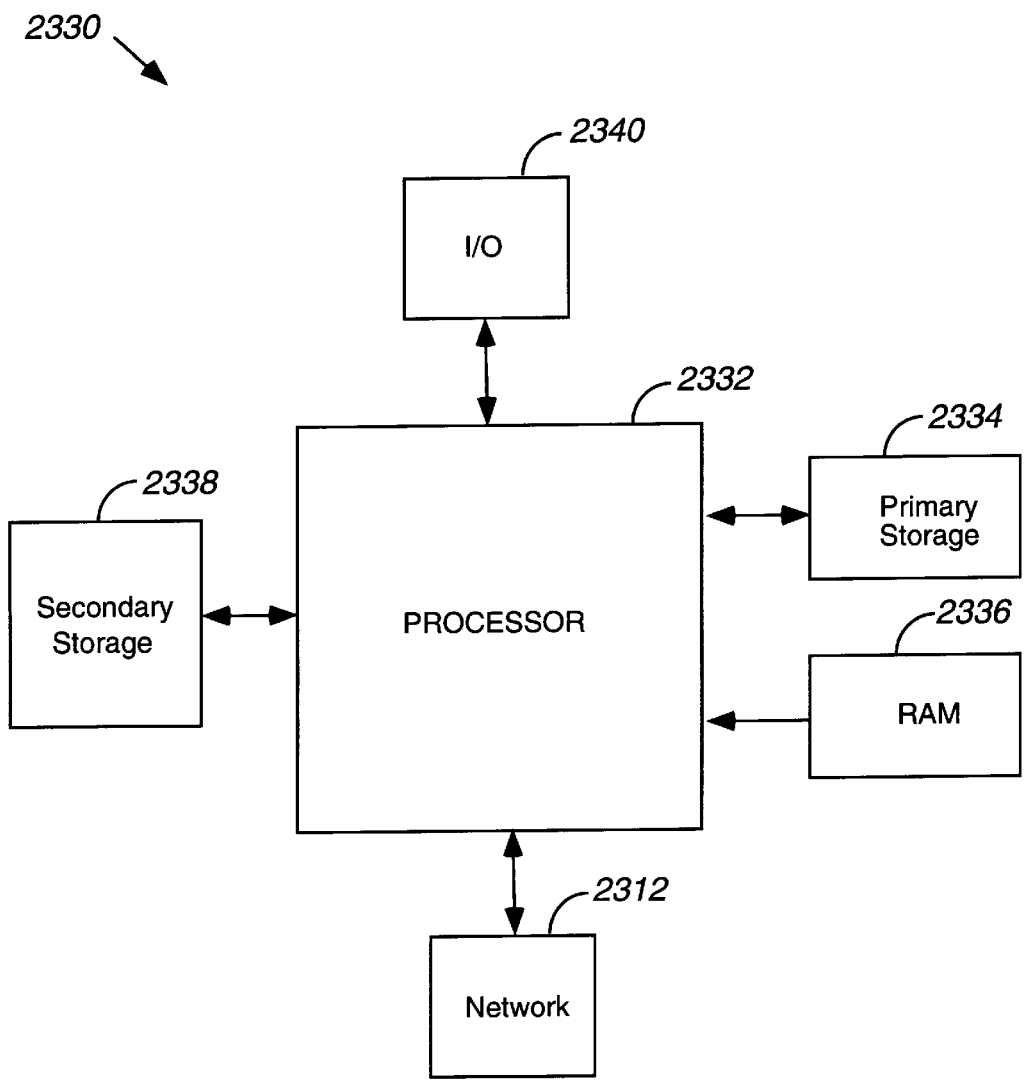
FIG. 23 is a diagrammatic representation of a general-purpose computer system suitable for implementing the present invention.

FIG. 23 illustrates a typical, general-purpose computer system suitable for implementing the present invention. A computer system 2330 includes at least one processor 2332, also referred to as a central processing units (CPU), that is coupled to memory devices. The memory devices may generally include primary storage devices 2334, such as a read only memory (ROM), and primary storage devices 2336, such as a random access memory (RAM).

As is well known in the art, ROM 2334 acts to transfer data and instructions uni-directionally to CPU 2332, while RAM 2336 is used typically to transfer data and instructions to and from CPU 2332 in a bi-directional manner. Both primary storage devices 2334, 2336 may include substantially any suitable computer-readable media. A secondary storage medium 2338, which is typically a mass memory device, may also be coupled bi-directionally to CPU 2332.

In general, secondary storage medium 2338 is arranged to provide additional data storage capacity, and may be a computer-readable medium that is used to store programs including computer code, computer program code devices, data, and the like. In one embodiment, secondary storage medium 2338 may be a system database which is shared by multiple computer systems. Typically, secondary storage medium 2338 is a storage medium such as a hard disk or a tape which may be slower than primary storage devices 2334, 2336. Secondary storage medium 538 may take the form of a well-know device including, but not limited to, magnetic and paper tape readers. As will be appreciated by those skilled in the art, the information retained within secondary storage medium 2338, may, in appropriate cases, be incorporated in a standard fashion as part of RAM 2336, e.g., as virtual memory. A specific primary storage device 2334 such as a CD-ROM may also pass data uni-directionally to CPU 2332.

CPU 2332 is also coupled to one or more input/output devices 540 that may include, but are not limited to, video monitors, track balls, mice, keyboards, microphones, touch-sensitive displays, transducer card readers, magnetic or paper tape readers, tablets, styluses, voice or handwriting recognizers, as well as other well-known input devices, such as other computers. Such devices may be used, for example, to allow a user to interface with a client. Finally, CPU 2332 may be coupled to a computer or a telecommunications network, e.g., an internet network or an intranet network, using a network connection as shown generally at 2312. With such a network connection 2312, it is contemplated that the CPU 2332 may receive information from a network. CPU 2332 may also output information to the network. Such information, which is often represented as a sequence of instructions to be executed using CPU 2332, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, while a client has been described as interfacing with observers which generally include a map, it should be appreciated that observers which are in communication with a client may generally be widely varied. In one embodiment, a client may interface with observers which have substantially no graphical representation.

Any suitable computer programming language may generally be used to implement the present invention. One particularly suitable computer programming language for use in implementing the present invention is the Java programming language, developed by Sun Microsystems, Inc. of Palo Alto, Calif. The Java programming language is particularly suitable due to the fact that the Java programming language is a platform-independent programming language. It should be appreciated, however, that other programming languages including, but not limited to, platform-independent programming languages, may be used as appropriate in lieu of the Java programming language in some embodiments.

The steps associated with the various methods and processes described above may generally vary. That is, steps may be added, removed, re-ordered, and altered without departing from the spirit or the scope of the present invention. In some embodiments, the methods may include steps which involve the throwing of exceptions when appropriate. By way of example, an exception may be thrown during the registration of a client when a socket may not be opened between a server and a client. Alternatively, an exception may be thrown to indicate that a client has been unsuccessfully registered with an ORB during the start up of the client. It should be appreciated that, typically, an exception may be thrown substantially any time an operation, e.g., a process step, is not successfully completed.

In general, the process of starting a client thread in the server may vary widely. For example, a currently referenced object may be checked against a filter associated with the appropriate client thread or, more specifically, the client that is in communication with the client thread. It should be appreciated that the filter is generally included in the filter tree that is a part of the server. After the currently referenced object is checked against the filter, when it is determined that the object passes the filter, i.e., that the object is of interest to the client associated with the client thread, a thread sleep time, which is a predetermined period of time that the client thread sleeps before attempting to perform an action, may be initialized. In general, the thread sleep time may vary widely depending upon the requirements of a particular system. In addition, after the client sends an object to the client, the client thread may await acknowledgment from the client that the object has been received for a given period of time that may range from on the order of microseconds to on the order of seconds, depending upon overall system capabilities and requirements. In such an embodiment, a determination may be made regarding whether an acknowledgment from the client was received from the client within the given period of time. If the determination in is that an acknowledgment was not received in the given period of time, then the implication is that the object was not received by the client, and the thread sleep time may be incremented. The thread may then be put to sleep for the period of time specified by the thread sleep time, during which time the client may become available to receive transmissions from the server, before another attempt is made to stream the object over the socket to the client.

As described above with respect to FIG. 2, replicating a first server on a second server may allow a client, which is out of the communications range of the first server, to communicate with the second server. It should be appreciated that when a client may communication with both servers, the link, e.g., the RF link, typically has a transmitter-receiver at each of the overall server machines and at the client machine. Such a transmitter-receiver would generally be the only wireless link available with respect to each machine. However, in some embodiments, the wireless networking scheme may vary such that the use of substantially one single transmitter-receivers on each machine may be unnecessary. By way of example, other wireless systems may include, but are not limited to, systems used for cellular telephones and satellite phone systems. For such wireless systems, there may be an existing wireless infrastructure. Hence, as long as the client machine may enter into some point of the wireless network, the client machine is likely not to be out of the communications range of any particular server machine. In such a case, the use of a duplicate server may serve the main purpose of providing back-up copies of information stored on a server.

While the present invention has generally been described in terms of servers and clients which are in communication across intermittent RF links, it should be appreciated that the servers and clients may also be in communication over substantially any suitable link. For instance, servers and clients may generally be in communication over any intermittent, low-bandwidth link. Alternatively, servers and clients may also be in communication over high-bandwidth links.

In one embodiment, the present invention may be applied to a client/server computing system in which a client and a server are in communication over a high-bandwidth link without departing from the spirit or the scope of the present invention. When object on a server is to be replicated on a client over a high-bandwidth link, algorithms which are associated with general database replication may be used to replicate the server object. By way of example, a two-phase commit algorithm may be used. In a two-phase commit algorithm, a server and a client essentially both "commit" to transferring data. Alternatively, an asynchronous log-based replication scheme may be used. In an asynchronous log-based replication scheme, a log may be kept of changes to the server, then may be sent to all clients associated with the server in an asynchronous fashion. Therefore, the present examples are to be considered as illustrative and not restrictive, and the invention is not to be limited to the details given herein, but may be modified within the scope of the appended claims.

What is claimed is:

1. A client/server object-based computing system, the computing system comprising:

a server, the server including a server object list, the server object list being arranged to include objects that are to be updated, the objects having data and functionality, wherein the objects that are to be updated include a first object, the server further including a filter tree, the filter tree being arranged to identify the objects in which the client has interest;

a client, the client being in communication with the server over a low-bandwidth link, the client including a client object list, the client object list including an object in which the client has interest, the object in which the client has interest being the first object, wherein the server is arranged to send a message to the client indicating that the object in which the client has interest should be updated on the client, the client further being arranged to update the object in which the client has interest using a handler associated with the client;

a feed handler, the feed handler being in communication with the handler and the server, the feed handler being arranged to queue messages from the handler the messages being intended for the server;

an observer, the observer being in communication with the client, wherein the client is arranged to notify the observer when the object in which the client has interest is updated; and a data file, the data file being arranged to store a copy of the server object list.

2. A client/server object-based computing system according claim 1 wherein the low-bandwidth link is an RF link.

3. A client/server object-based computing system according to claim 1 wherein the messages are object update notifications arranged to indicate to the server that the object in which the client has interest is updated.

4. A client/server object-based computing system according to claim 1 wherein the data file is a persistent data file.

5. A client/server object-based computing system according to claim 1 further including a class server, the class server being in communication with the client, wherein the class server includes methods which may be downloaded by the client.

6. A client/server object-based computing system according to claim 1 wherein the message sent from the server to the client is an automatic update message that causes the object in which the client has interest to be substantially automatically updated on the client.

7. A client/server object-based computing system according to claim 1 wherein the objects that are to be updated are objects that are to be updated on the client in response to updating on the server, and the object in which the client has interest is stored on the client.

8. A client/server object-based computing system according to claim 7 wherein the object in which the client has interest that is stored on the client is substantially a copy of an object stored on the server.

9. A client/server object-based computing system according to claim 1 wherein the client is further arranged to update the object in which the client has interest in response to the message sent to the client indicating that the object in which the client has interest should be updated on the client.

10. A client/server object-based computing environment comprising:

a server, the server including a server object list, the server object list being arranged to include an object that is to be updated, the object having data and functionality, wherein the server object list is further arranged to be copied into a data file that is associated with the server, the server further including a filter tree;

a client, the client including a client object list, the client object list including at least one object that is of interest to the client, the at least one object being the object that is to be updated, the client being arranged to be in communication with the server via a client thread, the client thread being a part of the server, the client being arranged to send a request to the server through the client thread, the server being arranged to receive the request from the client through the client thread, the request being a request to update the server object, wherein the client thread is arranged to reference the server object list, and wherein the filter tree is referenced by the client thread, the filter tree being arranged to determine whether the object that is to be updated is a representation of the object that is of interest to the client, the client including a handler that is associated with the object that is of interest to the client; and a feed handler, the feed handler being arranged to queue messages from the handler, the feed handler further being arranged to send the messages to the server.

11. A client/server object-based computing system according to claim 10 wherein the request is a request to create a topic for the filter tree.

12. A client/server object-based computing environment according to claim 10 wherein the server is further arranged to update the server object by placing the object update in the server object list.

13. A client/server object-based computing environment according to claim 10 wherein the client is arranged to receive a message, the message being sent from one of the server and the feed handler.

14. A client/server object-based computing environment according to claim 13 wherein the message is a message to update the object that is of interest to the client.

15. A method for updating a first object on a client, the client being arranged to be a part of a client/server object-based computing environment, the method comprising:

determining whether the first object is in existence on the client;

obtaining a class name for a handler that is associated with the first object when it is determined that the first object is not in existence on the client;

creating an instance of the handler, wherein the instance of the handler is associated with first object;

determining whether there is a second object that is referenced by the first object when the first object is in existence on the client;

determining whether the client is in communication with a server, the server being a part of the client/server object-based computing environment, wherein the client is in communication with the server over a low-bandwidth communications link;

opening a transaction with a data file when the client is not in communication with the server, the data file being associated with the client;

sending an update message to the handler that is associated with the first object when the first object is in existence on the client when the client is in communication with the server, the handler being a part of the client;

storing the update message in the data file;

closing the transaction with the data file;

adding a reference that identifies the second object to the first object when it is determined that the second object is referenced by the first object, the reference being a resolved reference; and sending a notification message to the handler that is arranged to indicate the existence of the second object when it is determined that the second object is referenced by the first object and when the client is in communication with the server.

16. A method as recited in claim 15 further including notifying the observer that the first object has been updated, the observer being in communication with the client.

17. A method as recited in claim 15 further including:

determining whether a reference to the first object has been requested by a third object; and notifying the third object of the existence of the first object when it is determined that the first object has been requested by the third object.

18. A method as recited in claim 15 wherein creating an instance of the handler includes creating a graphical component for the handler.

19. A method as recited in claim 15 further including:

determining whether the handler is in existence on an overall client machine, the client machine including the client; and obtaining the handler using an object request broker when it is determined that the handler is not in existence on the overall client machine, wherein the object request broker is a part of the client/server object-based computing environment, the object request broker further being in communication with the client.

20. A method as recited in claim 15 wherein the low-bandwidth communications link is a RF link.

21. A method as recited in claim 15 wherein adding the first object to an object list includes:

obtaining a lock for the object list;

writing the first object to the object list; and releasing the lock.

22. A computer program product arranged to update a first object on a client, the client being arranged to be a part of a client/server object-based computing environment, the computer program product comprising:

computer code for determining whether the first object is in existence on the client;

computer code for obtaining a class name for a handler that is associated with the first object when it is determined that the first object is not in existence on the client;

computer code for creating an instance of the handler, wherein the instance of the handler is associated with first object;

computer code for determining whether there is a second object that is referenced by the first object when the first object is in existence on the client;

computer code for determining whether the client is in communication with a server, the server being a part of the client/server object-based computing environment, wherein the client is in communication with the server over a low-bandwidth communications link;

computer code for opening a transaction with a data file when the client is not in communication with the server, the data file being associated with the client;

computer code for sending an update message to the handler that is associated with the first object when the first object is in existence on the client when the client is in communication with the server, the handler being a part of the client;

computer code for storing the update message in the data file;

computer code for closing the transaction with the data file;

computer code for adding a reference that identifies the second object to the first object when it is determined that the second object is referenced by the first object, the reference being a resolved reference;

computer code for sending a notification message to the handler that is arranged to indicate the existence of the second object when it is determined that the second object is referenced by the first object and when the client is in communication with the server; and a computer-readable medium that stores the computer codes.

* * * * *